(12) United States Patent
Charles et al.

(10) Patent No.: US 10,597,161 B2
(45) Date of Patent: Mar. 24, 2020

(54) SPACE-OPTIMIZING SEATING ARRANGEMENTS FOR PASSENGER TRANSPORT AND METHODS THEREFOR

(71) Applicant: B/E Aerospace, Inc., Wellington, FL (US)

(72) Inventors: Anthony Michael Charles, Mercer Island, WA (US); Peter A. Hoeft, Seattle, WA (US); Arthur Y. Wu, Seattle, WA (US); Alexander Nicholas Pozzi, Winston-Salem, NC (US)

(73) Assignee: B/E AEROSPACE, Inc., Winston-Salem, NC (US)

(*) Notice: Subject to any disclaimer, the term of this patent is extended or adjusted under 35 U.S.C. 154(b) by 264 days.

(21) Appl. No.: 15/436,550

(22) Filed: Feb. 17, 2017

(65) Prior Publication Data

US 2017/0233057 A1    Aug. 17, 2017

Related U.S. Application Data

(60) Provisional application No. 62/296,241, filed on Feb. 17, 2016.

(51) Int. Cl.
*B64D 11/06* (2006.01)

(52) U.S. Cl.
CPC ...... *B64D 11/0601* (2014.12); *B64D 11/0604* (2014.12); *B64D 11/0606* (2014.12)

(58) Field of Classification Search
CPC ............ B64D 11/0601; B64D 11/0604; B64D 11/0606
See application file for complete search history.

(56) References Cited

U.S. PATENT DOCUMENTS

| 7,290,735 B2* | 11/2007 | Saint-Jalmes ...... | B64D 11/0601 244/118.6 |
|---|---|---|---|
| 2010/0065684 A1* | 3/2010 | Ruiter ................... | B64D 11/06 244/118.6 |
| 2013/0119203 A1* | 5/2013 | Dupont ................. | B64C 1/18 244/137.2 |
| 2015/0274298 A1* | 10/2015 | Kircher .............. | B64D 11/0601 244/118.6 |
| 2016/0297528 A1* | 10/2016 | Sankrithi ........... | B64C 1/00 |

* cited by examiner

*Primary Examiner* — Valentina Xavier
(74) *Attorney, Agent, or Firm* — Clements Bernard Walker

(57) ABSTRACT

In illustrative embodiments, apparatus and associated methods relate to an aircraft cabin with an elevated zone along a centerline, and a main deck with passenger seating space located under the elevated zone. In an illustrative example, the elevated zone may include an elevated walkway between, for example, one or more cabins on either lateral side of the walkway. Access between the elevated zone and the main cabin may be via a stairway oriented, for example, along the longitudinal axis of the aircraft. The elevated zone may be advantageously retrofit or provided as original equipment that may increase passenger density, for example, and may further provide for enhanced amenities.

16 Claims, 22 Drawing Sheets

SPACE-OPTIMIZING SEATING ARRANGEMENTS FOR PASSENGER TRANSPORT AND METHODS THEREFOR

CROSS-REFERENCE TO RELATED APPLICATIONS

This application claims priority to U.S. Provisional Patent Application Ser. No. 62/296,241, entitled "Space-Optimizing Seating Arrangements for Passenger Transport and Methods," filed by Charles, et al., on Feb. 17, 2016, hereby incorporated by reference in its entirety.

BACKGROUND

Commercial aircraft provide seating for passengers, integrating safety features required by the FAA with comfort and entertainment features. More efficient seating arrangements may increase the airline's profitability and as such, airlines may balance passenger comfort, with seating capacities. Commercial airlines may provide different comfort levels, charging more for arrangements that take up more valuable space, or that provide more amenities, such as first-class or business-class.

SUMMARY OF ILLUSTRATIVE EMBODIMENTS

Apparatus and associated methods relate to an aircraft cabin with an elevated zone along a centerline, and a main deck with passenger seating space located under the elevated zone. In an illustrative example, the elevated zone may include an elevated walkway between, for example, one or more cabins on either lateral side of the walkway. The cabins in the elevated zone may each include, for example, a digital display panel in lieu of windows. Access between the elevated zone and the main cabin may be via a stairway oriented, for example, along the centerline. In some implementations, the passenger seating on the main deck may be arranged in, for example, a herringbone pattern. The elevated zone may be advantageously retrofit or provided as original equipment that may increase passenger density, for example, and may further provide for enhanced amenities.

Various embodiments may achieve one or more advantages. For example, the number of passengers in a commercial aircraft may be increased without sacrificing comfort, by providing advantageous cabin layouts. The airline may offer customers individual cabin rooms for passengers that range in size depending on the specific zone of the aircraft.

In some embodiments, passengers may be provided with seats that may face forward during take-off taxiing and landing (TTL), may rotate sideways during a flight, and may convert to into a bed that lies substantially flat. In areas where windows may not be installed, some embodiments may provide passengers with a wall mounted digital display panel, which may advantageously provide travelers with a more open feel in lieu of line-of-sight access to a window through the fuselage. Some examples may beneficially permit the airline and passengers a diverse set of seating options and amenity levels to passengers who choose to travel in specific seating zones.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION OF ILLUSTRATIVE EMBODIMENTS

The description set forth below in connection with the appended drawings is intended as a description of various embodiments of the disclosed subject matter and is not necessarily intended to represent the only embodiments. In certain instances, the description includes specific details for the purpose of providing an understanding of the disclosed embodiments. However, it will be apparent to those skilled in the art that the disclosed embodiments may be practiced without those specific details. In some instances, well-known structures and components may be shown in block diagram form in order to avoid obscuring the concepts of the disclosed subject matter.

References throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "proximate," "minor," and similar terms generally refer to ranges that include the identified value within a margin of 20%, 10% or preferably 5% in certain embodiments, and any values therebetween.

Figure 1:
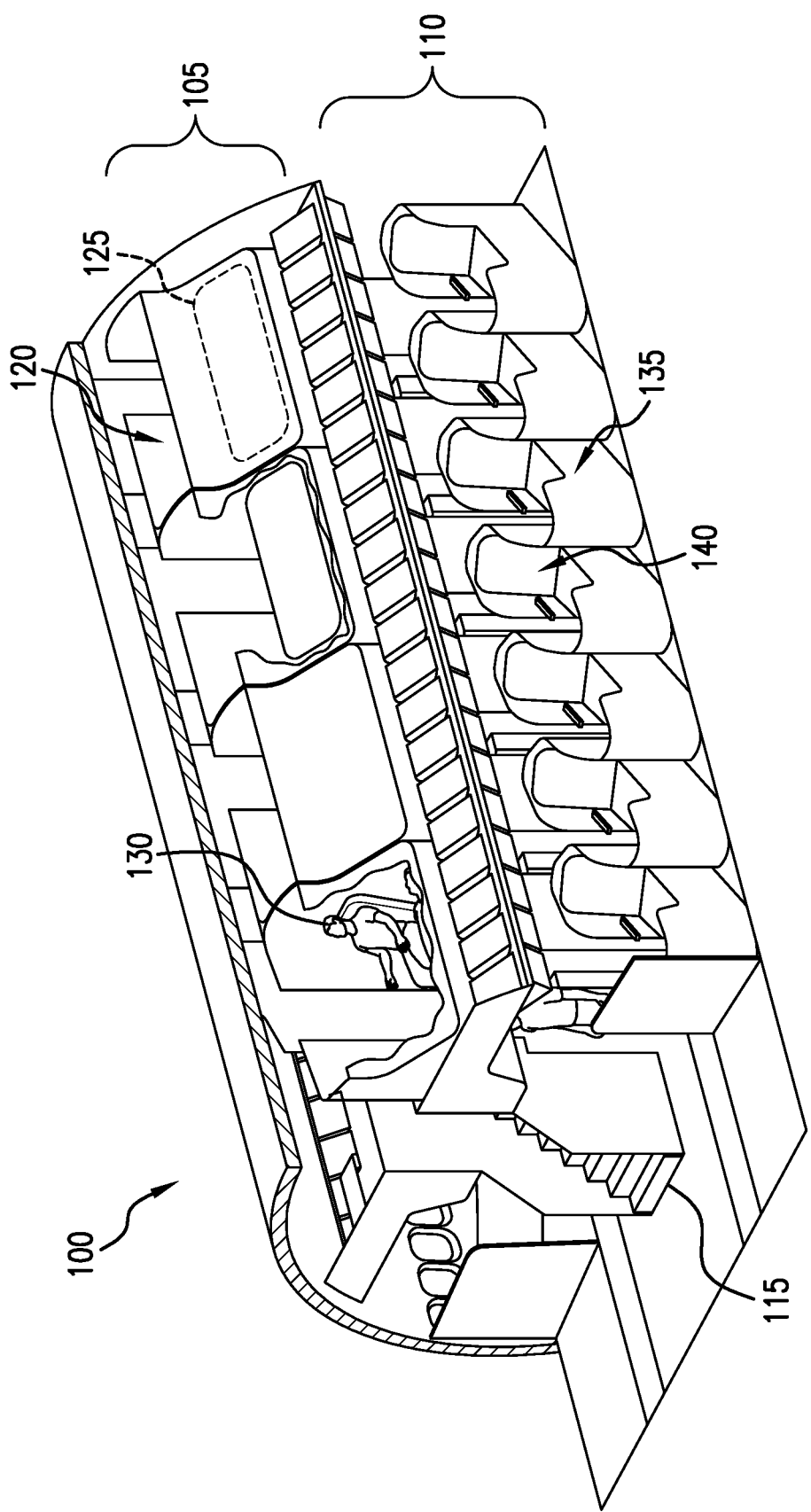
FIG. 1 depicts a perspective view of an aircraft cabin illustrating an exemplary upper and lower deck arrangement.

FIG. 1 depicts a perspective view of an aircraft cabin illustrating an exemplary upper and lower deck arrangement. An aircraft cabin 100, includes an upper deck 105 and a lower deck 110. The upper deck 105 is fixedly coupled to a staircase 115. The staircase 115 is fixedly coupled to the lower deck 110. The upper deck 105 includes multiple individual passenger cabins 120. The individual passenger cabins 120 contain digital display units 125. In some examples the digital display units 125 may provide passengers 130 with a substantially open feeling. The lower deck 110 contains multiple individual passenger pods 135. Each of the individual passenger pods 135 includes an individual passenger seat 140.

Figure 2:
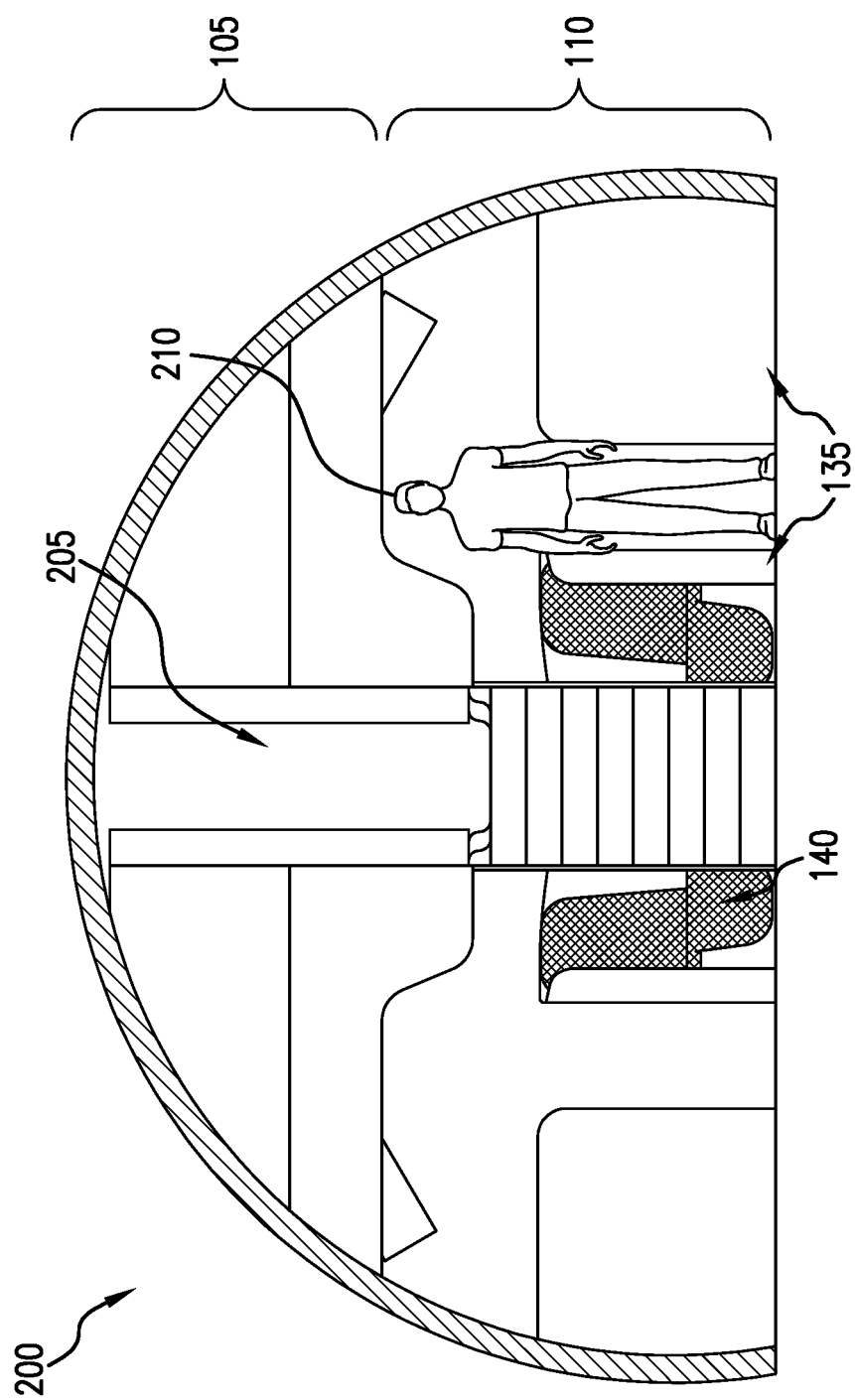
FIG. 2 depicts a front elevation view of an aircraft cabin illustrating an exemplary upper and lower deck arrangement.

FIG. 2 depicts a front elevation view of an aircraft cabin illustrating an exemplary upper and lower deck arrangement. An aircraft cabin 200, includes the upper deck 105 and the lower deck 110. The upper deck 105 is fixedly coupled to a staircase 115. The staircase 115 is fixedly coupled to the lower deck 110. The upper deck 105 includes an elevated walkway 205. In some embodiments, the elevated walkway 205 may employ the space above the lower deck 110, to advantageously gain additional passenger capacity. A passenger 210 may gain access between the lower deck 110 and the elevated walkway 205 via the staircase 115. The lower deck 110 contains the individual passenger pods 135. Each of the individual passenger pods 135 includes the individual passenger seat 140.

Figure 3:
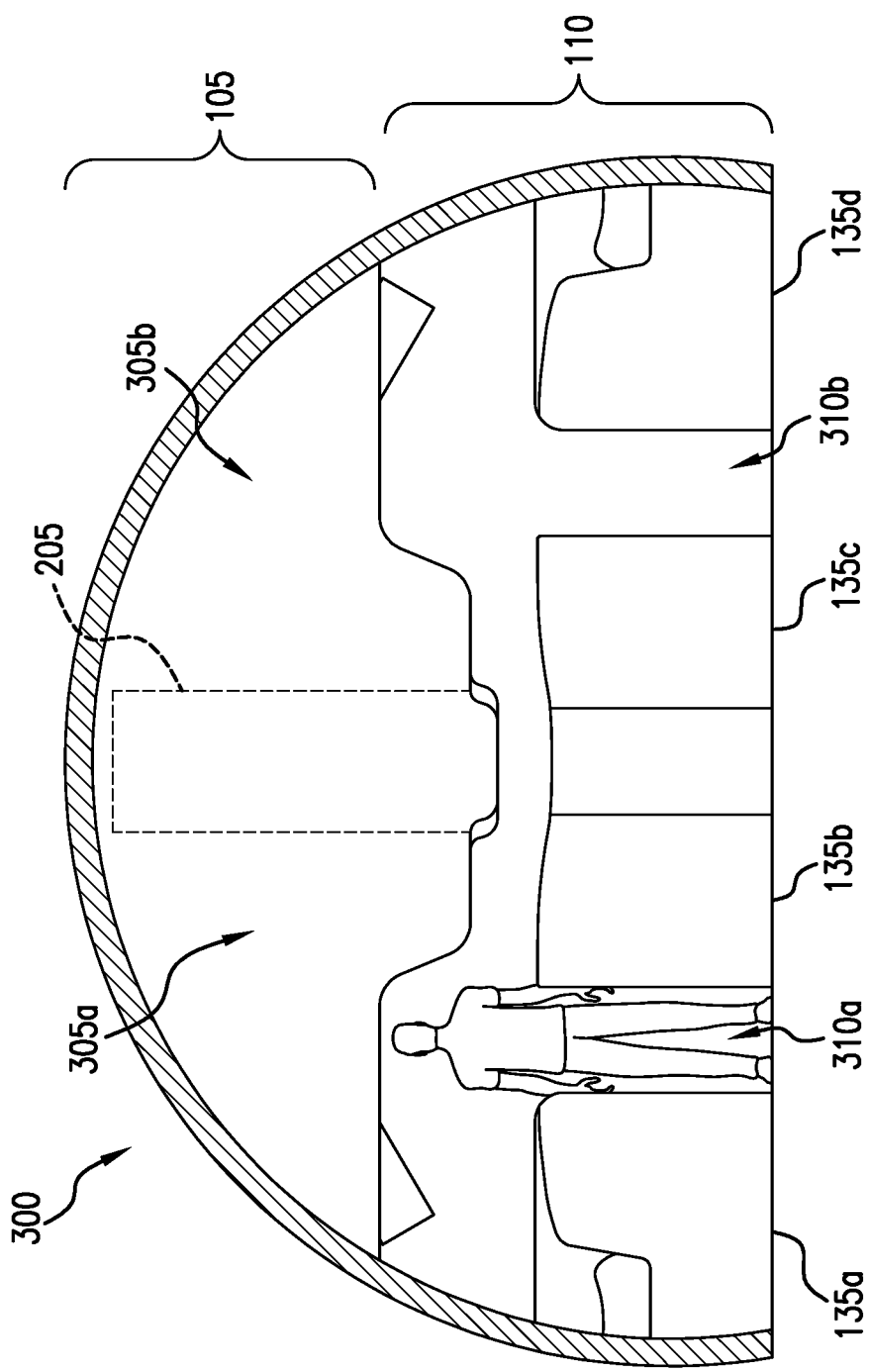
FIG. 3 depicts a rear elevation view of an aircraft cabin illustrating exemplary business-class suites arrangement, beneath an elevated walkway.

FIG. 3 depicts a rear elevation view of an aircraft cabin illustrating exemplary business-class suites arrangement, beneath an elevated walkway. An aircraft cabin 300, includes the upper deck 105 and the lower deck 110. The lower deck 110 contains multiple individual passenger pods 135a, 135b, 135c and 135d, in a business-class zone. The upper deck 105 includes the elevated walkway 205. The elevated walkway 205 includes access to a cabin area 305a and 305b. In an illustrative example, the elevated walkway 205 gives access to the cabin areas 305a and 305b, benefiting aircraft with additional passenger capacity. The aircraft cabin 300, includes a pair of aisles 310a and 310b. In some embodiments, the upper deck 105 may be advantageously formed to provide substantially ample headroom within the two aisles 310a and 310b. In an exemplary embodiment the shape of the upper deck 105 with the lowered middle portion, may benefit passengers with substantially ample headroom in the elevated walkway 205 within the upper deck 105.

Figure 4:
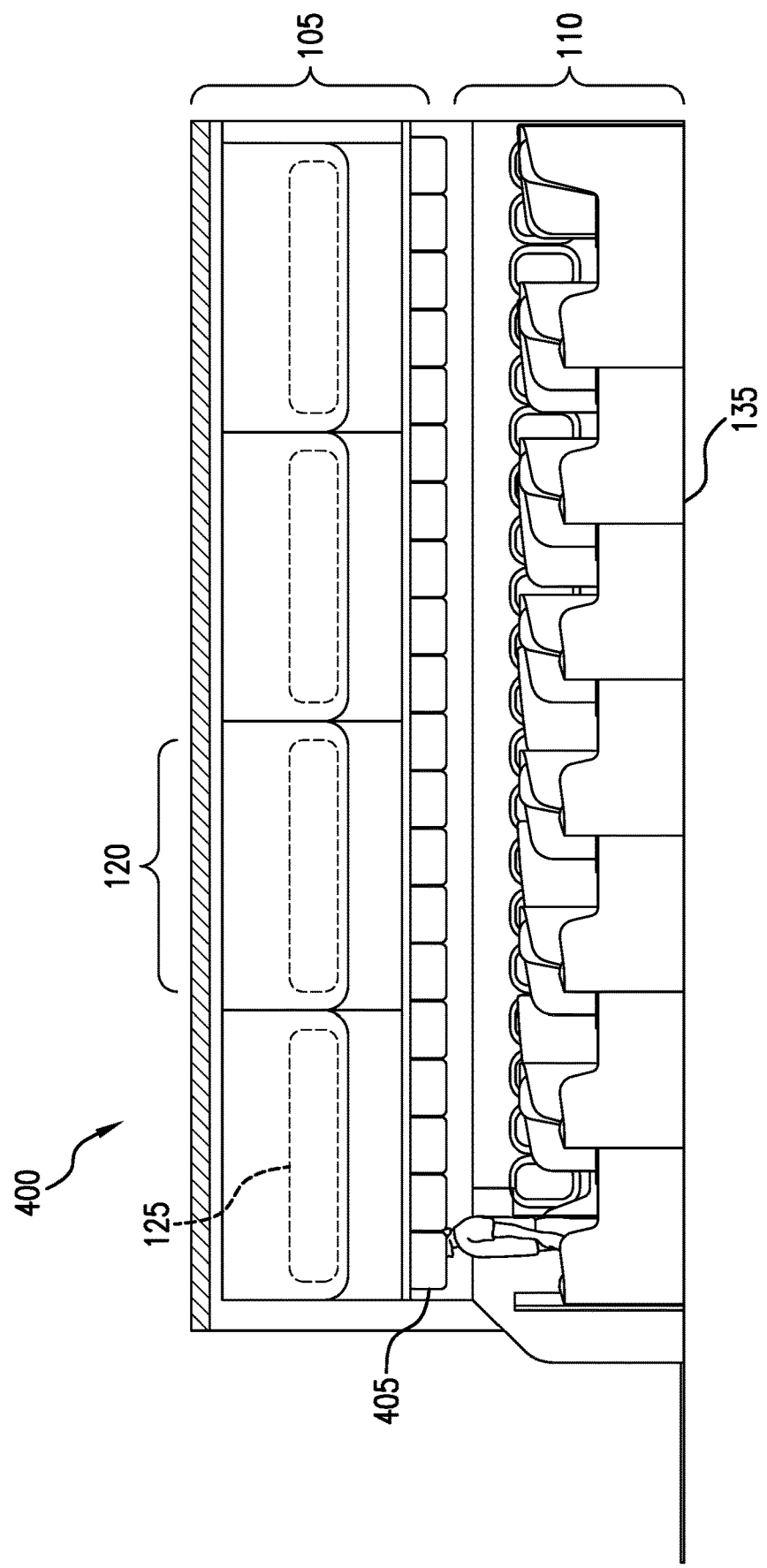
FIG. 4 depicts a side elevation view of an aircraft cabin illustrating exemplary first-class suites arrangement.

FIG. 4 depicts a side elevation view of an aircraft cabin illustrating exemplary first-class suites arrangement. An aircraft cabin 400, includes the upper deck 105 and the lower deck 110. The lower deck 110 contains multiple stowage compartments 405. The lower deck 110 contains the individual passenger pods 135. Each of the individual passenger pods 135 includes the individual passenger seat 140. The upper deck 105 includes the individual passenger cabins 120. The individual passenger cabins 120 contain the digital display units 125.

Figure 5:
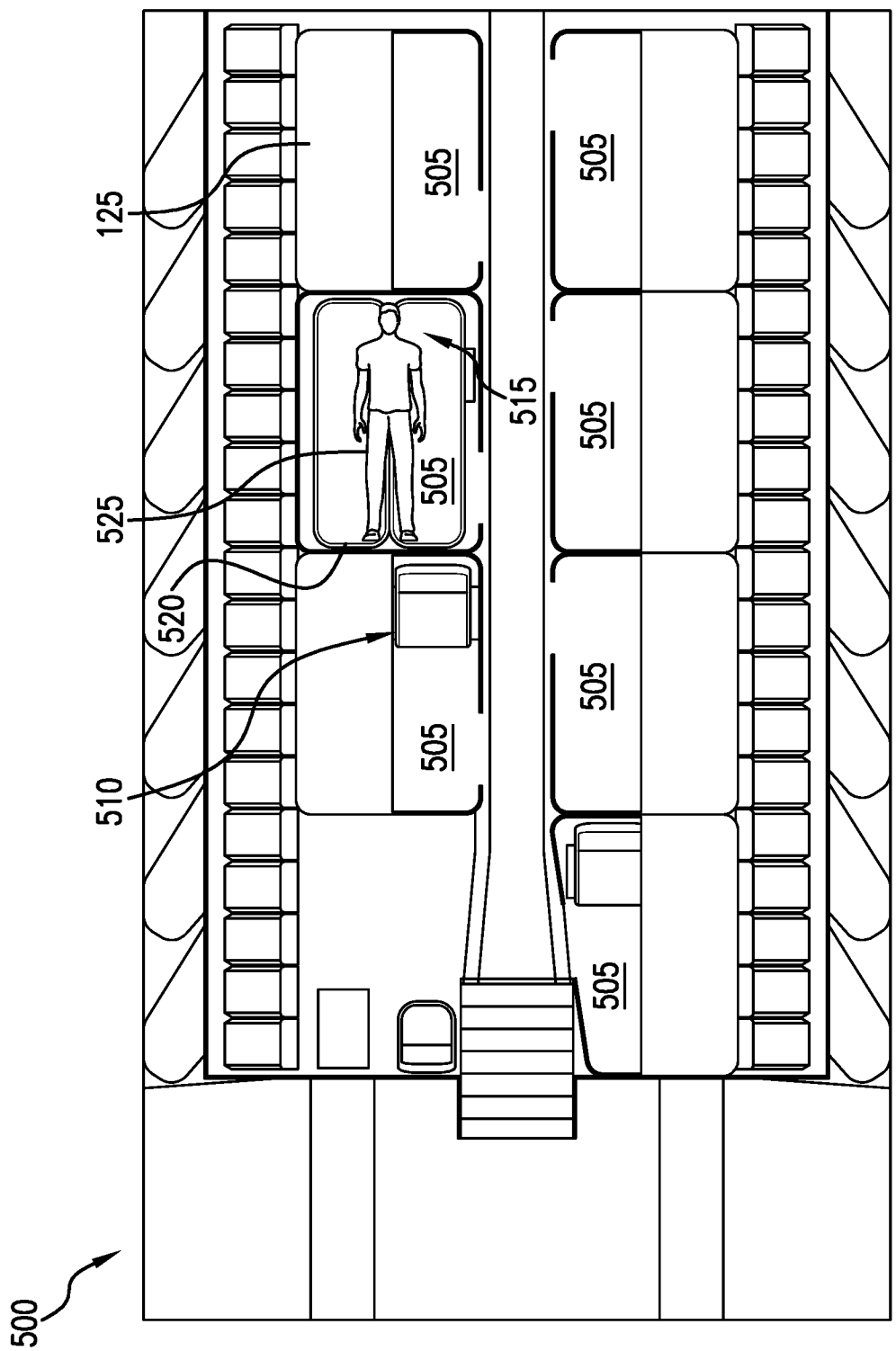
FIG. 5 depicts a plan view of an aircraft cabin illustrating an exemplary upper deck arrangement.

FIG. 5 depicts a plan view of an aircraft cabin illustrating an exemplary upper deck arrangement. An upper deck of an aircraft cabin 500 includes multiple first-class suites 505. In some examples the first-class suites 505 may include a transformable chair 510. In some examples the transformable chairs 510 may be unfolded, into a co-planar sleeping surface 515. In some examples, the first-class suites 505 may include a permanent sleeping surface 520. In some examples, the permanent sleeping surface 520, may be substantially below the digital display units 125. In an illustrative example, the permanent sleeping surface 520 and the co-planar sleeping surface 515, may be substantially co-planar, which may advantageously provide a wider sleeping surface for a larger passenger 525, for example.

Figure 6:
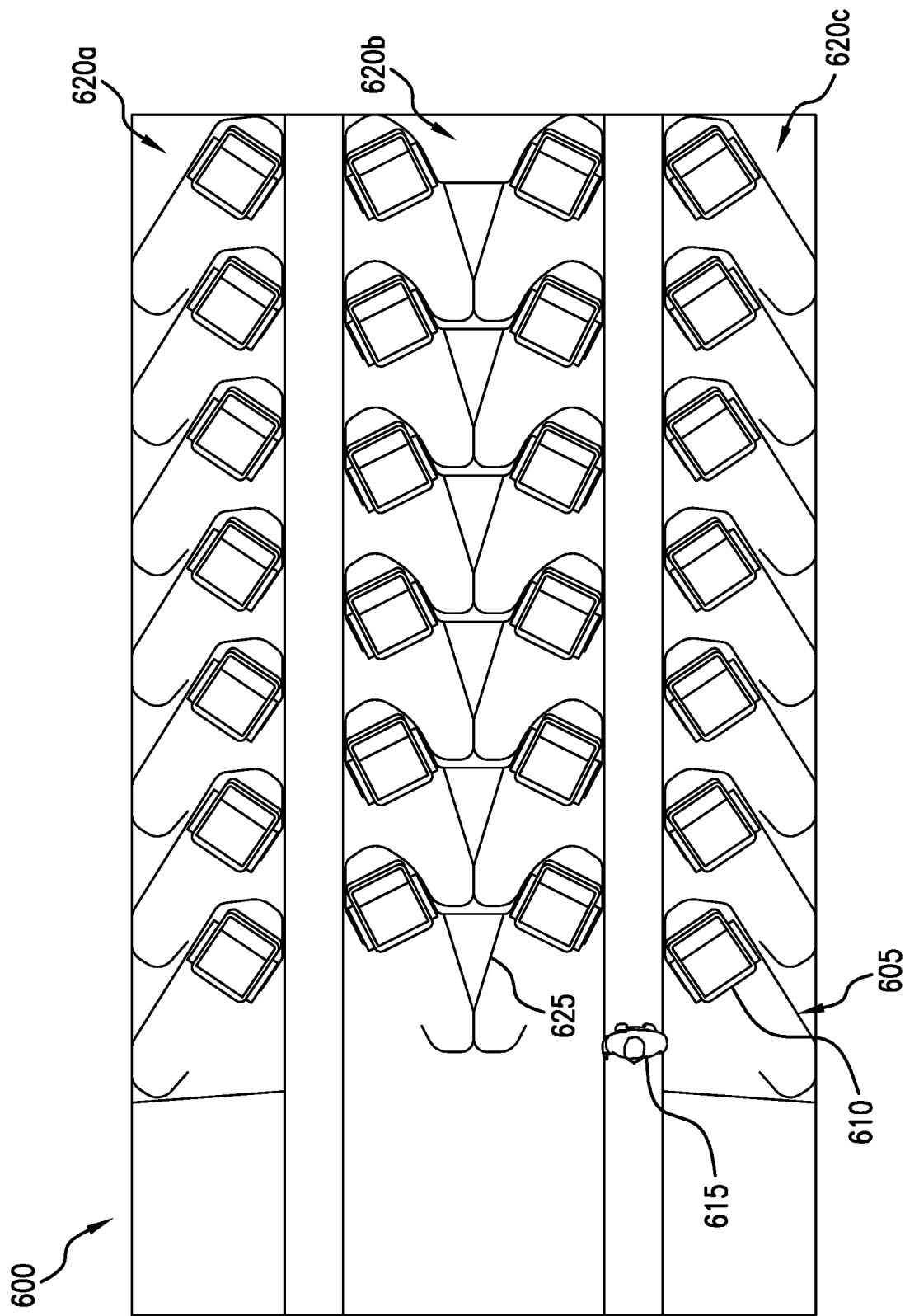
FIG. 6 depicts a plan view of an aircraft cabin illustrating an exemplary herringbone arrangement.

FIG. 6 depicts a plan view of an aircraft cabin illustrating an exemplary herringbone arrangement. A herringbone arrangement 600 includes multiple business-class seating pods 605. Each business-class seating pod 605 contains a business-class seat 610. Within the herringbone arrangement 600, a passenger 615 may find a benefit of substantially ample legroom. The herringbone arrangement 600 contains extra areas 620a, 620b, and 620c. In some examples the extra areas 620a, 620b, and 620c may be employed as storage units configured to stow additional luggage, supplies or equipment. In further examples, the extra areas 620*a*, 602*b*, and 620*c* may include stowage for entertainment offerings, such as pull out monitors, beverage centers, personal electronics docking, and/or headphone stowage. The herringbone arrangement 600 contains a nook area 625. In some examples the nook area 625 may become a support for a larger table surface to be shared by adjacent passengers. In some examples the nook area 625 may be employed as a shared beverage station or other convenience unit. In further examples, the nook area 625 may be employed as additional personal storage space or entertainment provision stowage (e.g., pull-out monitor, headphone dock, personal electronics dock, etc.).

Figure 7:
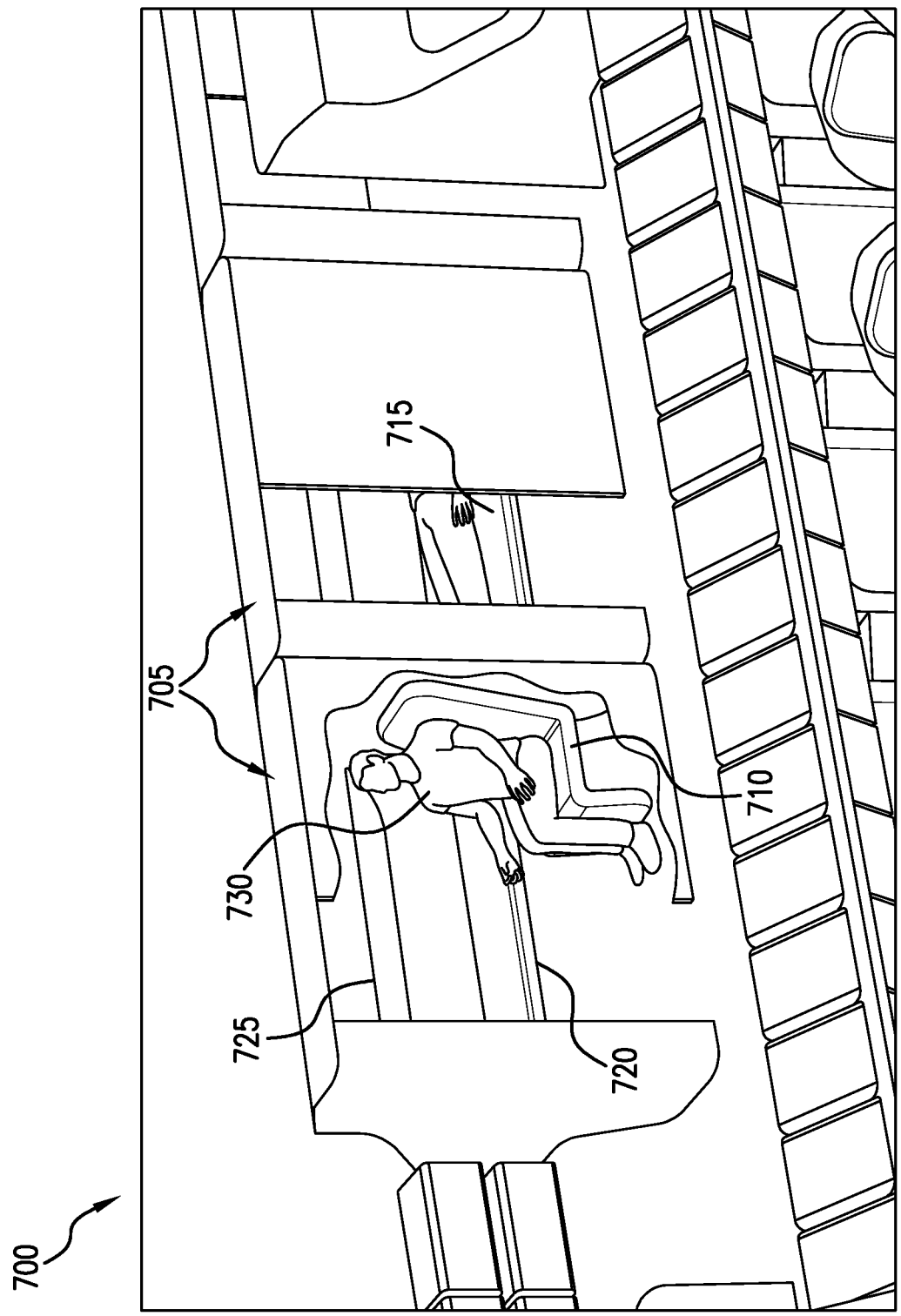
FIG. 7 depicts a perspective view of an aircraft cabin illustrating an exemplary upper deck private cabin arrangement.

FIG. 7 depicts a perspective view of an aircraft cabin illustrating an exemplary upper deck private cabin arrangement. The upper deck private cabin arrangement 700 includes a first-class cabin 705. The first-class cabin 705 contains a convertible chair 710. The convertible chair 710 converts into an extended full-size bed 715. The extended full-size bed 715 may be substantially co-planar with, and next to a fixed bed 720. In some examples the full-size bed 715 and the fixed bed 720 may form an extra wide sleeping surface. The fixed bed 720 may be converted into a couch by adding back supports and arm rests that fold out of an accessories door 725. In some embodiments, the accessories door 725 may be opened by a passenger 730 and may advantageously provide the accessories needed to assemble a couch setting for a family or co-workers, for example.

Figure 8:
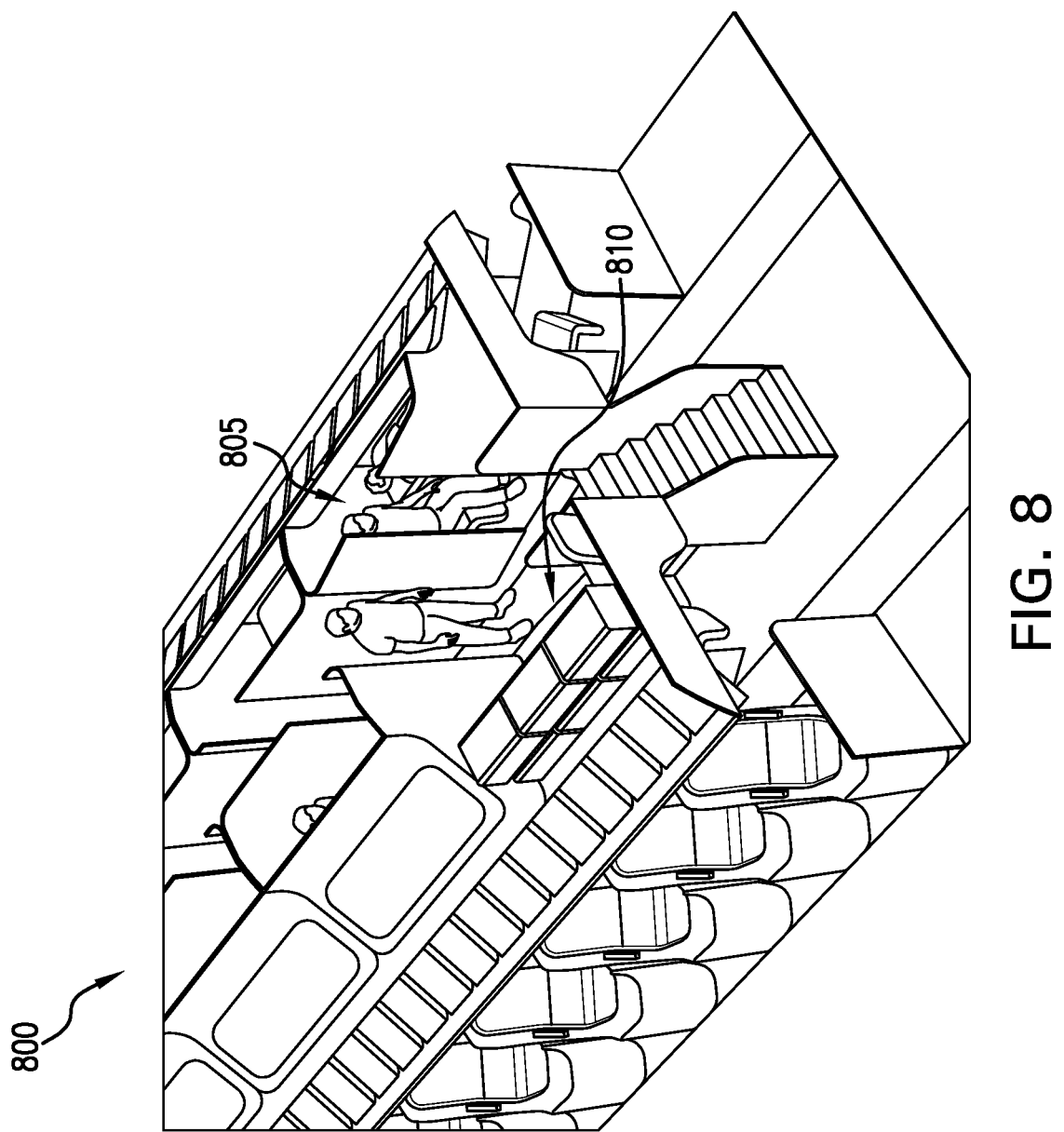
FIG. 8 depicts a perspective view of an aircraft cabin illustrating an exemplary flex space arrangement.

FIG. 8 depicts a perspective view of an aircraft cabin illustrating an exemplary flex space arrangement. An aircraft upper deck forward area 800 includes a first premium business-class suite 805. The upper deck forward area 800 also includes a flex space 810. In some embodiments, the flex space 810 may be employed for a second premium business-class suite. In some examples, the airline may choose to construct a lounge or bar area in the flex space 810, which may advantageously allow passengers to spend flight time together while enjoying a beverage or snacks. In some embodiments, the flex space 810 may be employed for general stowage, for example to stow luggage. In an illustrative example a flight attendant may rest in the flex space 810. In some embodiments, the flex space 810 may be employed to prepare food or beverages. In further embodiments, the flex space 810 may be utilized as a vending area, for example to inspect and purchase duty free goods.

Figure 9:
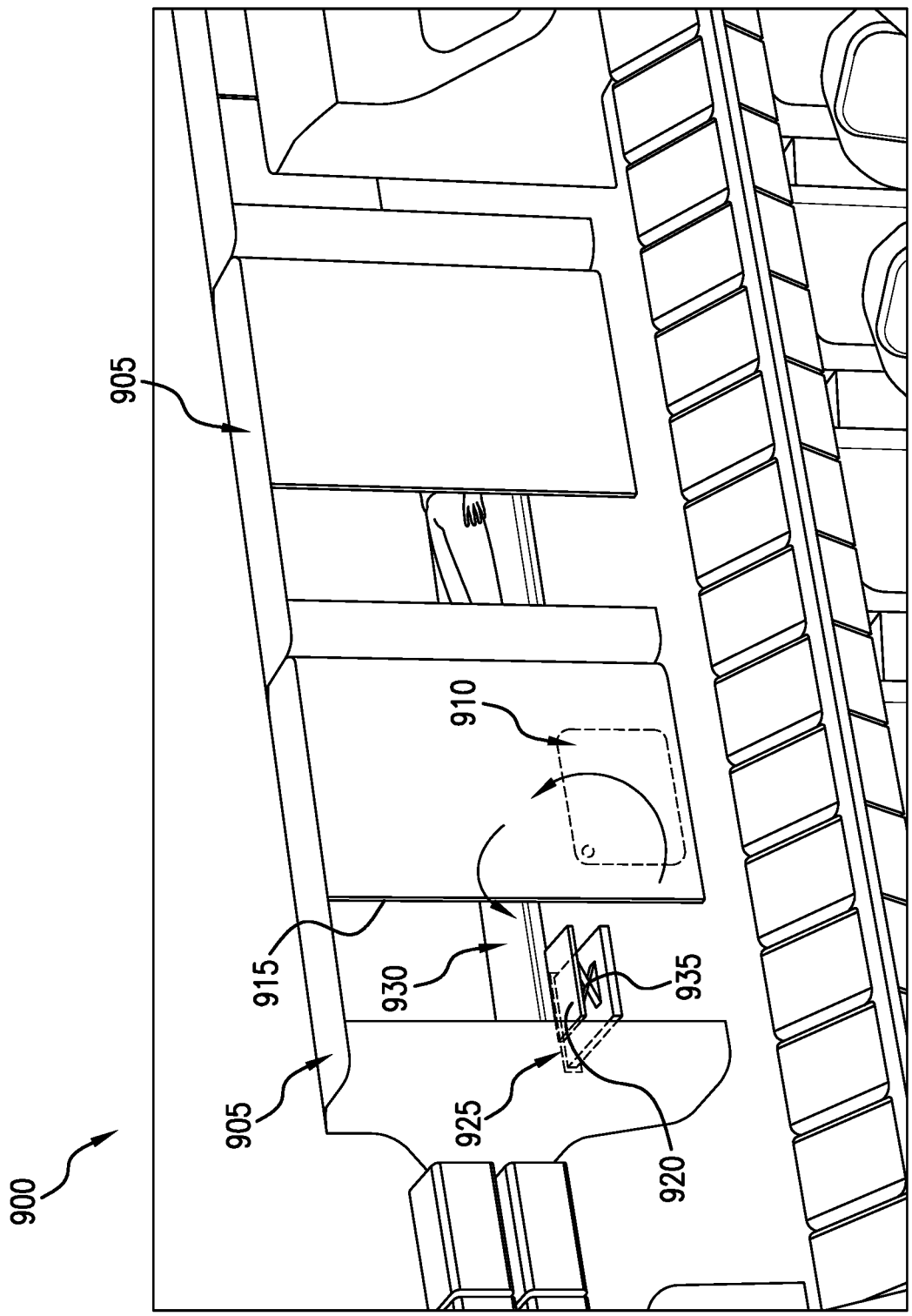
FIG. 9 depicts a perspective view of an aircraft cabin illustrating an exemplary upper deck private cabin arrangement with fold-out workspaces.

FIG. 9 depicts a perspective view of an aircraft cabin illustrating an exemplary upper deck private cabin arrangement with fold-out workspaces. An aircraft cabin 900 is depicted with two first-class suites 905. In some examples, the first-class suites 905 may include a work surface 910. The work surface 910 is rotatably coupled to the inside of an aisle-side wall 915. In an illustrative example, the work surface 910 may be deployed by first pivoting the work surface 910 in the plane of the aisle-side wall 915, then hinging the work surface 910 away from the aisle-side wall 915, to position the work surface 910 substantially level. The work surface 910 may contain a mechanical stop to hold the work surface 910 in place.

In some examples, the first-class suites 905 may include a collapsible desk 920. The collapsible desk 920 collapses and stores into a compartment 925, under a permanent bed 930. In some examples, the collapsible desk 920 may be an adjustable-height standing desk. In some examples the supports 935 for the collapsible desk 920, may be a scissors mechanism that may be adjustable to any suitable height. The collapsible desk 920, in one example, may function as a desk or coffee table unit.

Figure 10:
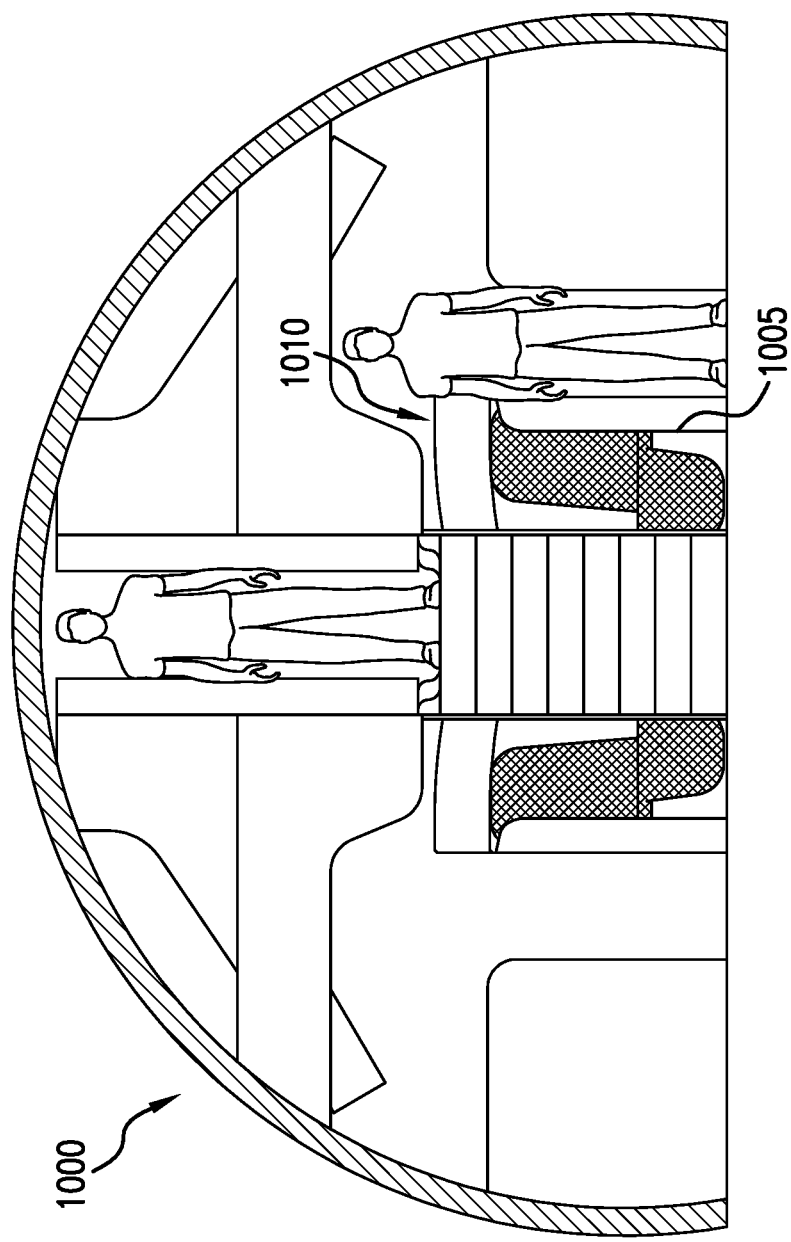
FIG. 10 depicts a front elevation view of an aircraft cabin illustrating an exemplary upper and lower deck arrangement with a chair head privacy wall.

FIG. 10 depicts a front elevation view of an aircraft cabin illustrating an exemplary upper and lower deck arrangement with a chair privacy head wall. An aircraft cabin 1000 contains a passenger pod 1005. The passenger pod 1005 is fixedly coupled to a privacy head wall 1010. In some examples the privacy head wall 1010 may be removably coupled to the passenger pod 1005. In some embodiments, the privacy head wall 1010, may advantageously provide additional privacy to the passenger pod 1005. The privacy pod, for example, may be used by nursing mothers at feeding times.

Figure 11:
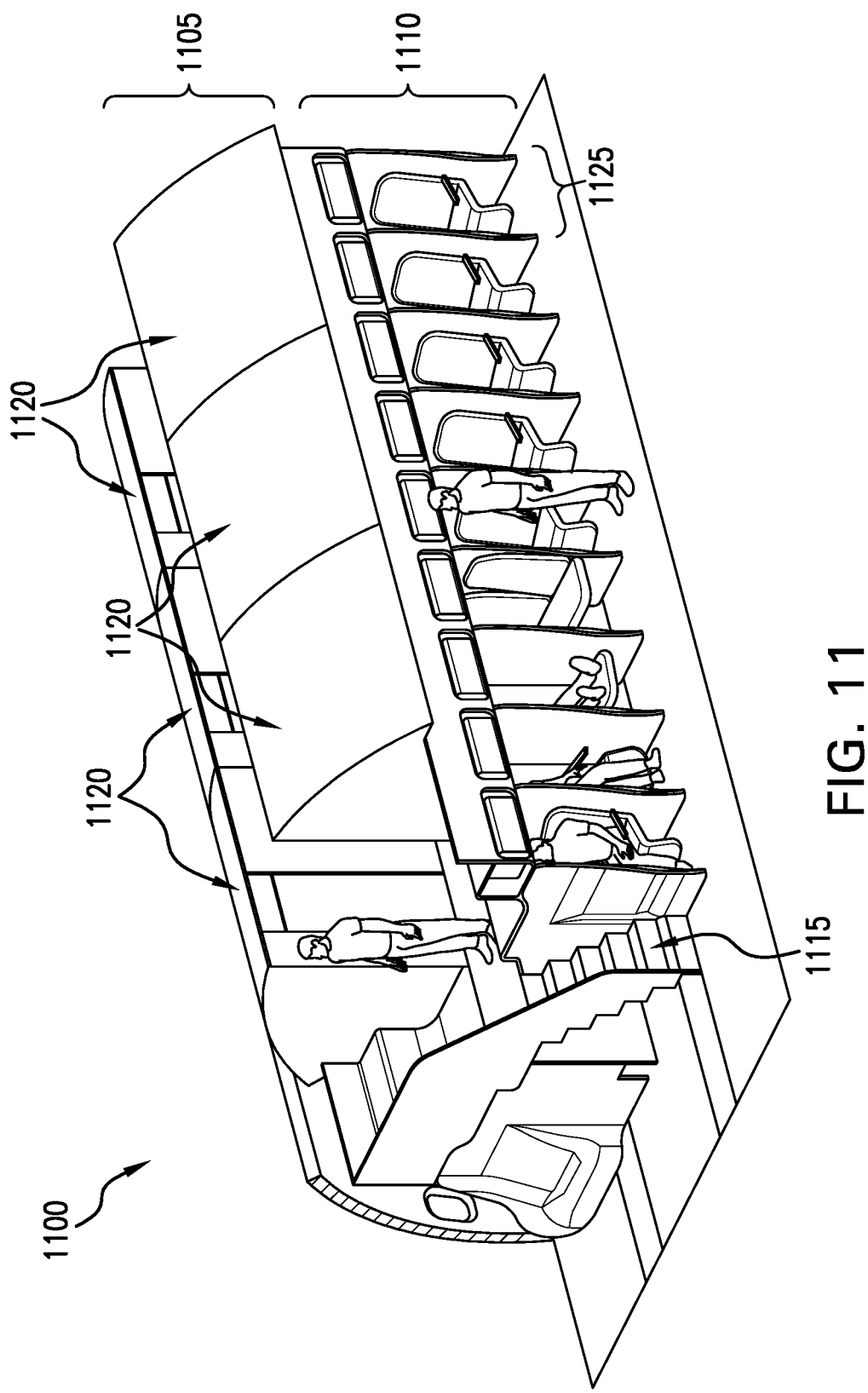
FIG. 11 depicts a perspective view of an aircraft cabin illustrating an exemplary upper and lower deck arrangement.

FIG. 11 depicts a perspective view of an aircraft cabin illustrating an exemplary upper and lower deck arrangement. An aircraft cabin 1100 includes an upper deck 1105 and a lower deck 1110. The upper deck 1105 is fixedly coupled to a staircase 1115. The staircase 1115 is fixedly coupled to the lower deck 1110. The upper deck 1105 includes multiple individual passenger cabins 1120. The lower deck 1110 contains multiple individual business-class suites 1125.

Figure 12:
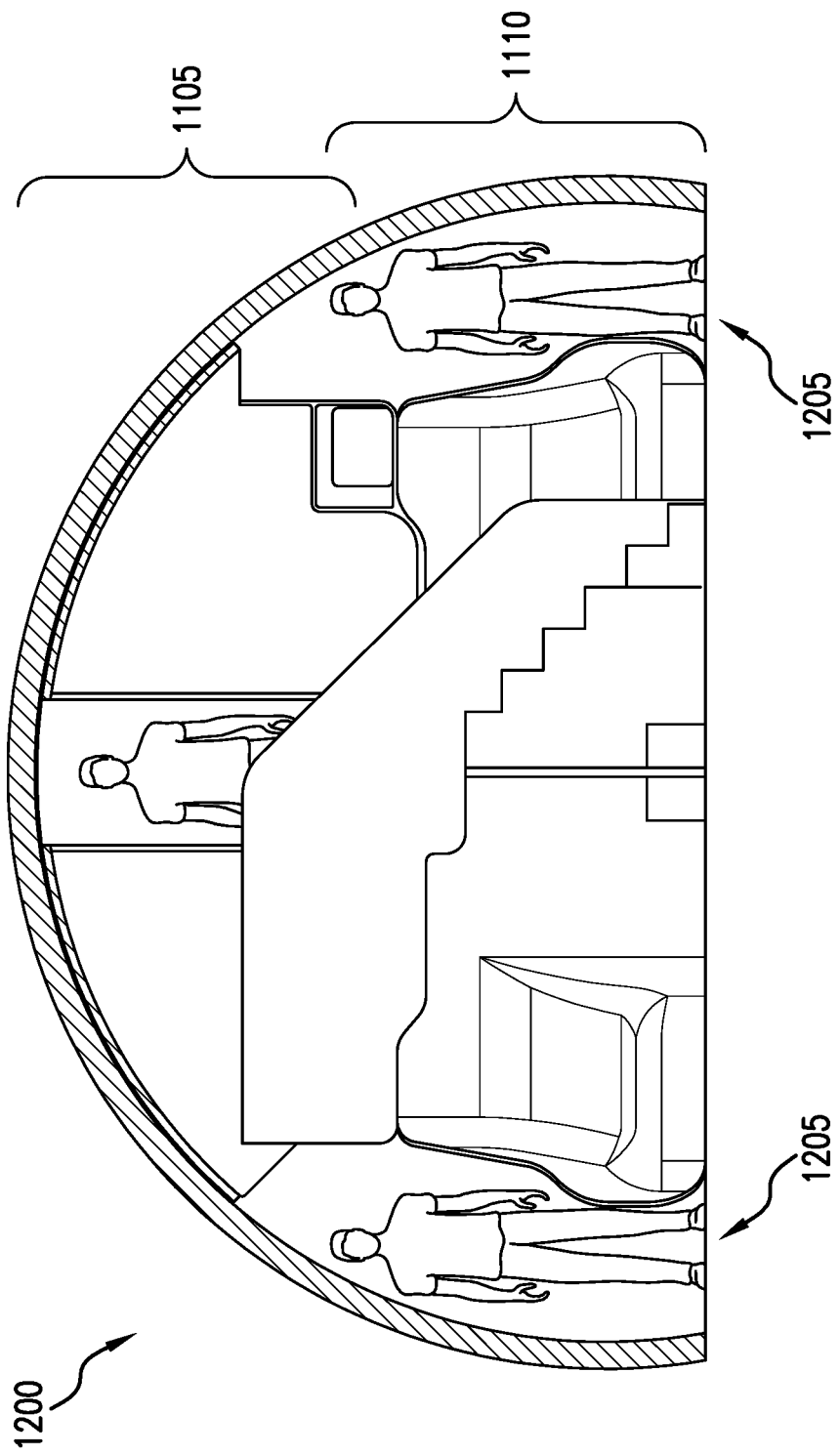
FIG. 12 depicts a front elevation view of an aircraft cabin illustrating an exemplary upper and lower deck arrangement.

FIG. 12 depicts a front elevation view of an aircraft cabin illustrating an exemplary upper and lower deck arrangement. An aircraft cabin 1200 includes the upper deck 1105 and the lower deck 1110. The lower deck 1110 includes two aisles 1205. The two aisles 1205 are located outboard within the aircraft cabin 1200.

Figure 13:
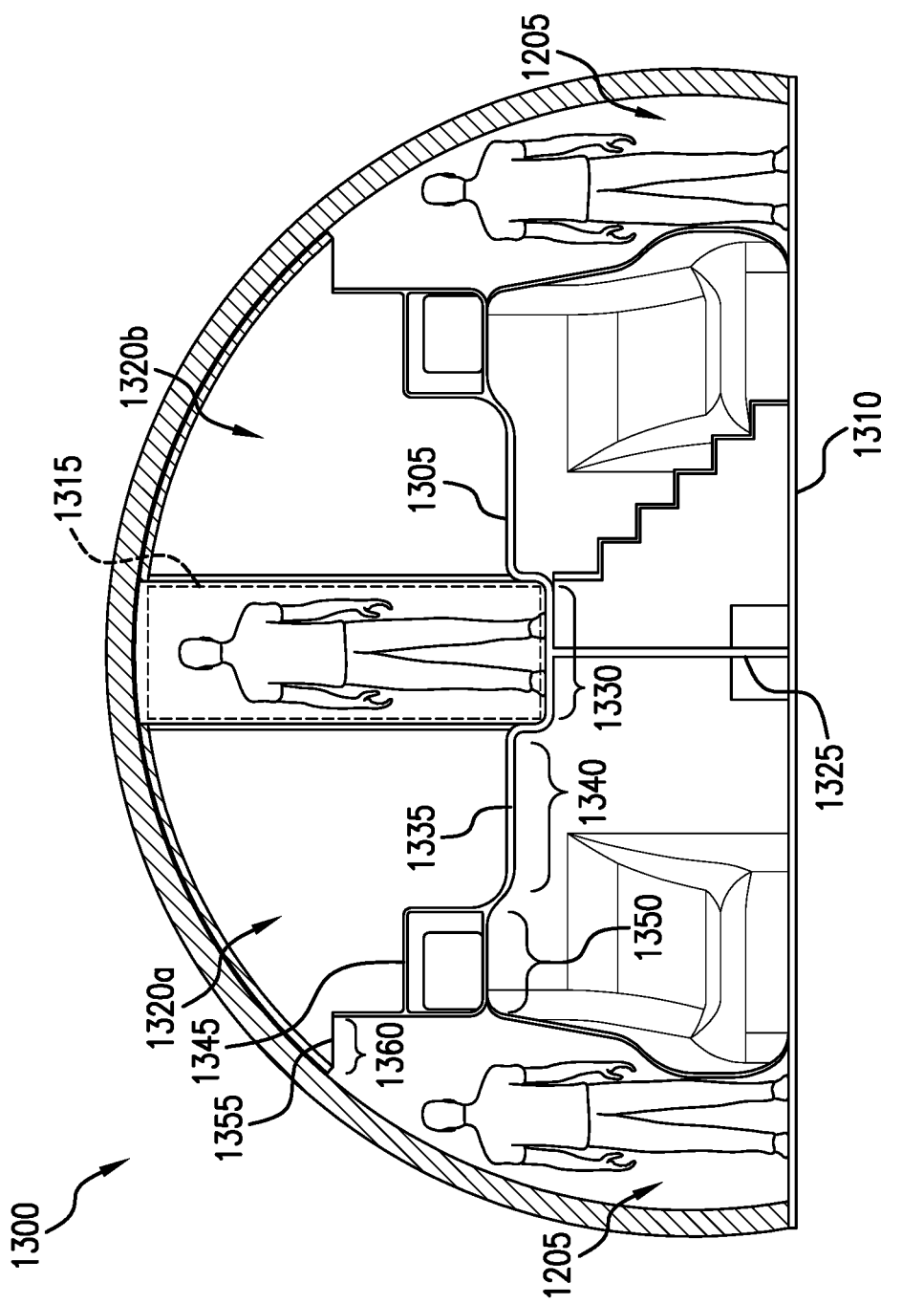
FIG. 13 depicts a rear elevation view of an aircraft cabin illustrating an exemplary upper level deck and main deck structures.

FIG. 13 depicts a rear elevation view of an aircraft cabin illustrating an exemplary upper level deck and main deck structures. An aircraft cabin 1300 includes an upper level deck 1305 and a main deck 1310. The upper level deck 1305 includes an elevated walkway 1315. The elevated walkway 1315 includes access to an upper personal cabins 1320*a* and 1320*b*. In some embodiments, the elevated walkway 1315 may provide passengers and crew access to the increased seating capacity. The main deck 1310 includes the two aisles 1205. The main deck 1310 is fixedly coupled to an upper level structural member 1325. In some examples the upper level structural member 1325 may provide support for the upper level deck 1305. In some embodiments, the upper level deck 1305 may be advantageously formed to provide substantially ample headroom within the two aisles 1205. The upper level deck 1305 includes a first portion 1330 located at a first elevation above the main deck 1310. The upper level deck 1305 further includes a cabin standing surface 1335 on either lateral side of the elevated walkway 1315. Each one of the cabin standing surfaces 1335 is disposed above a second portion 1340 of the upper level deck 1305 located at a second elevation above the main deck 1310. The upper level deck 1305 further includes a cabin sleeping surface 1345 adjacent to the cabin standing surfaces 1335. Each one of the cabin sleeping surfaces 1345 is disposed above a third portion 1350 of the upper level deck 1305 located at a third elevation above the main deck 1310. The upper level deck 1305 further includes a nook surface 1355 adjacent to the cabin sleeping surfaces 1345. Each one of the nook surfaces 1355 is disposed above a fourth portion 1360 of the upper level deck 1305 located at a fourth elevation above the main deck 1310. In some examples, the raised fourth portion 1360 may advantageously give passengers substantially ample headroom in the two aisles 1205. The fourth portion 1360 at the fourth elevation exceeds the third portion 1350 at the third elevation, which exceeds the second portion 1340 at the second elevation, which exceeds the first portion 1330 at the first elevation of the upper level deck 1305. The succession of elevations proceeds as in a staircase, coupling with gentle (e.g., substantially parabolic) connection curves.

Figure 14:
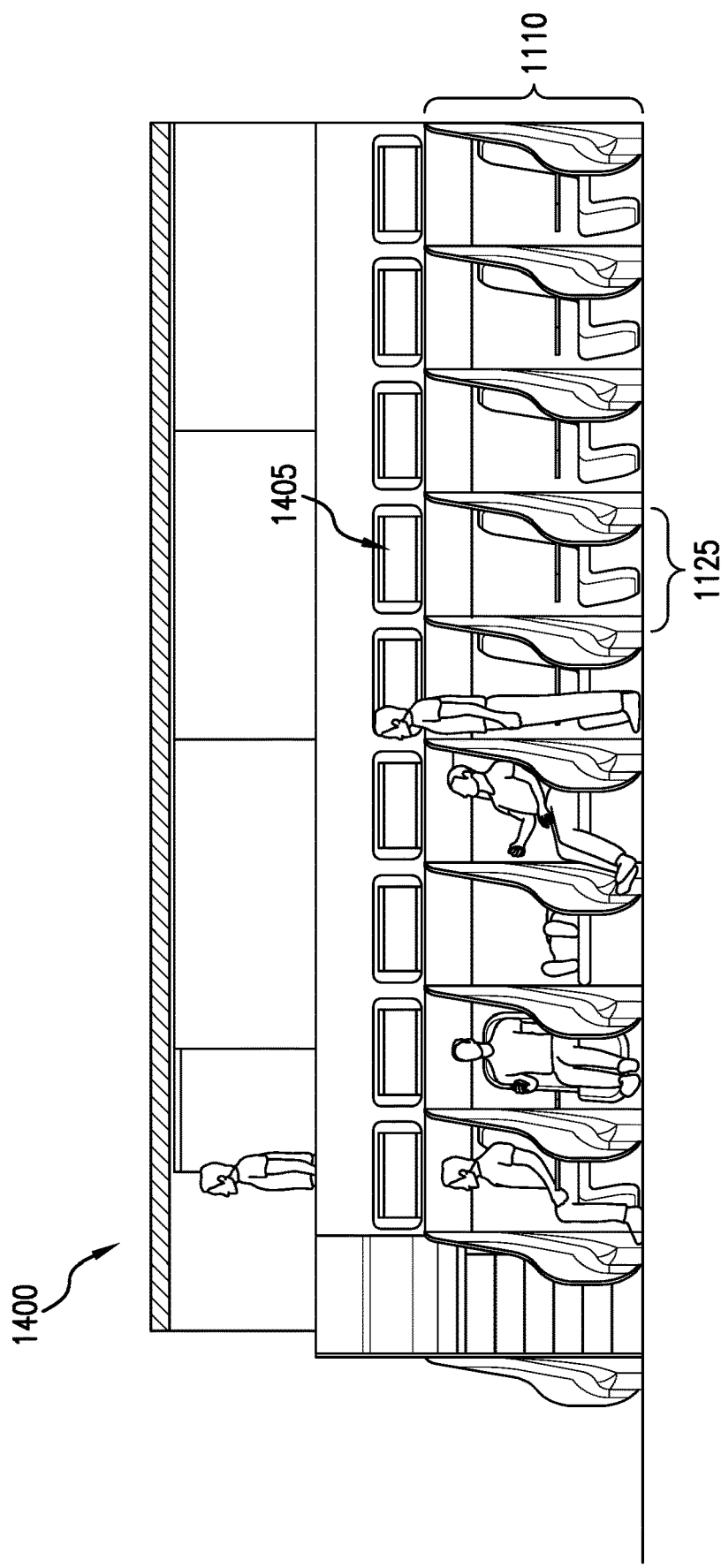
FIG. 14 depicts a side elevation view of an aircraft cabin illustrating an exemplary lower deck business-class seating arrangement.

FIG. 14 depicts a side elevation view of an aircraft cabin illustrating an exemplary lower deck business-class seating arrangement. An aircraft cabin 1400 includes the lower deck 1110. The lower deck 1110 includes the individual business-class suites 1125. Each individual business-class suite 1125 includes a dedicated overhead luggage storage compartment 1405.

Figure 15:
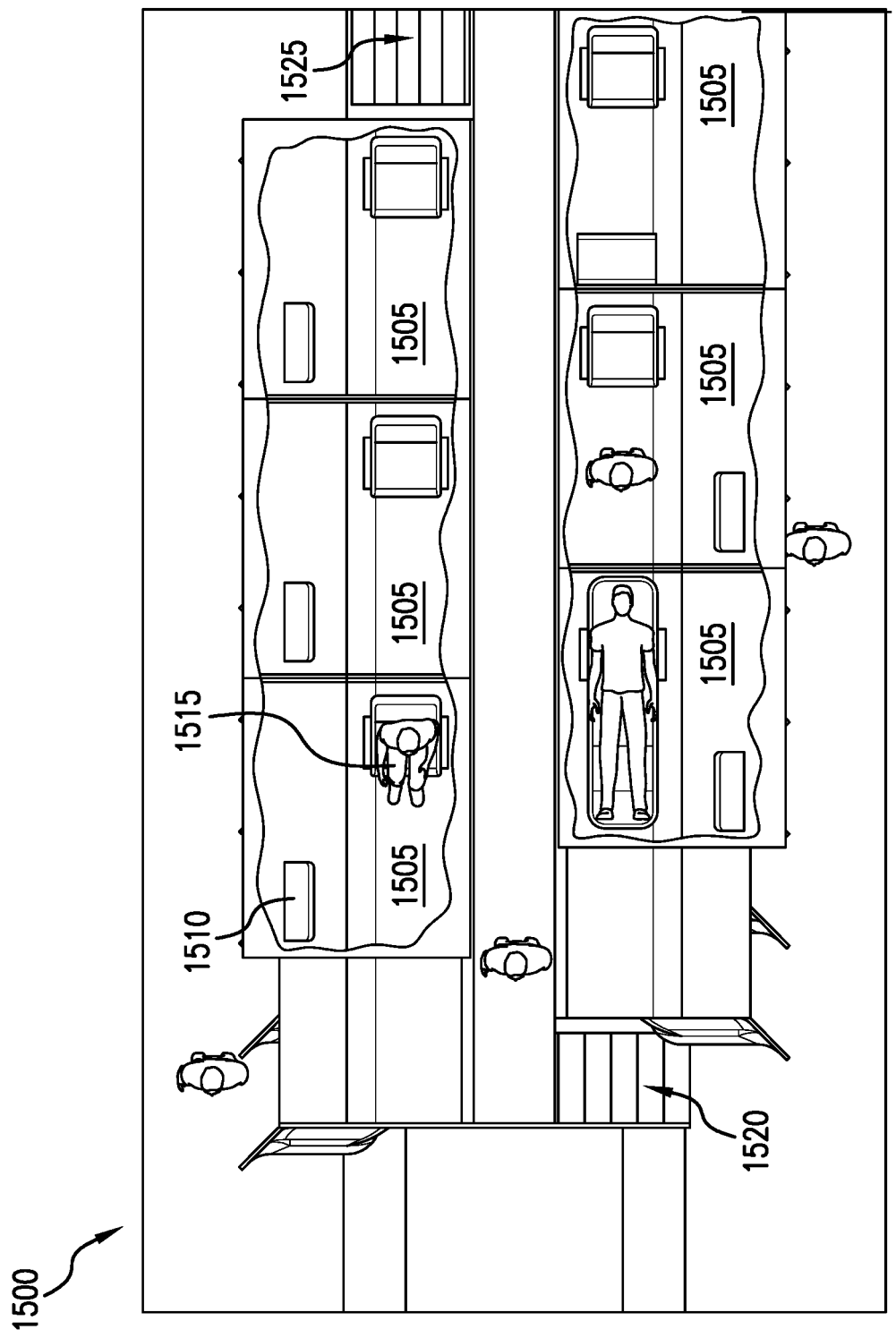
FIG. 15 depicts a plan view of an aircraft cabin illustrating an exemplary upper level first-class seating arrangement.

FIG. 15 depicts a plan view of an aircraft cabin illustrating an exemplary upper level first-class seating arrangement. An aircraft cabin upper level 1500 contains multiple first-class suites 1505. The first-class suites 1505 contain a video monitor 1510. In some embodiments, the video monitor 1510 may be a simulated aircraft window, which may advantageously give passengers 1515 a less closed-in feel. Rather than a single monitor, in further embodiments, the first-class suites 1505 may include a series of monitors simulating a series of aircraft windows. The aircraft cabin upper level 1500 also contains a forward staircase 1520 and an aft staircase 1525.

Figure 16:
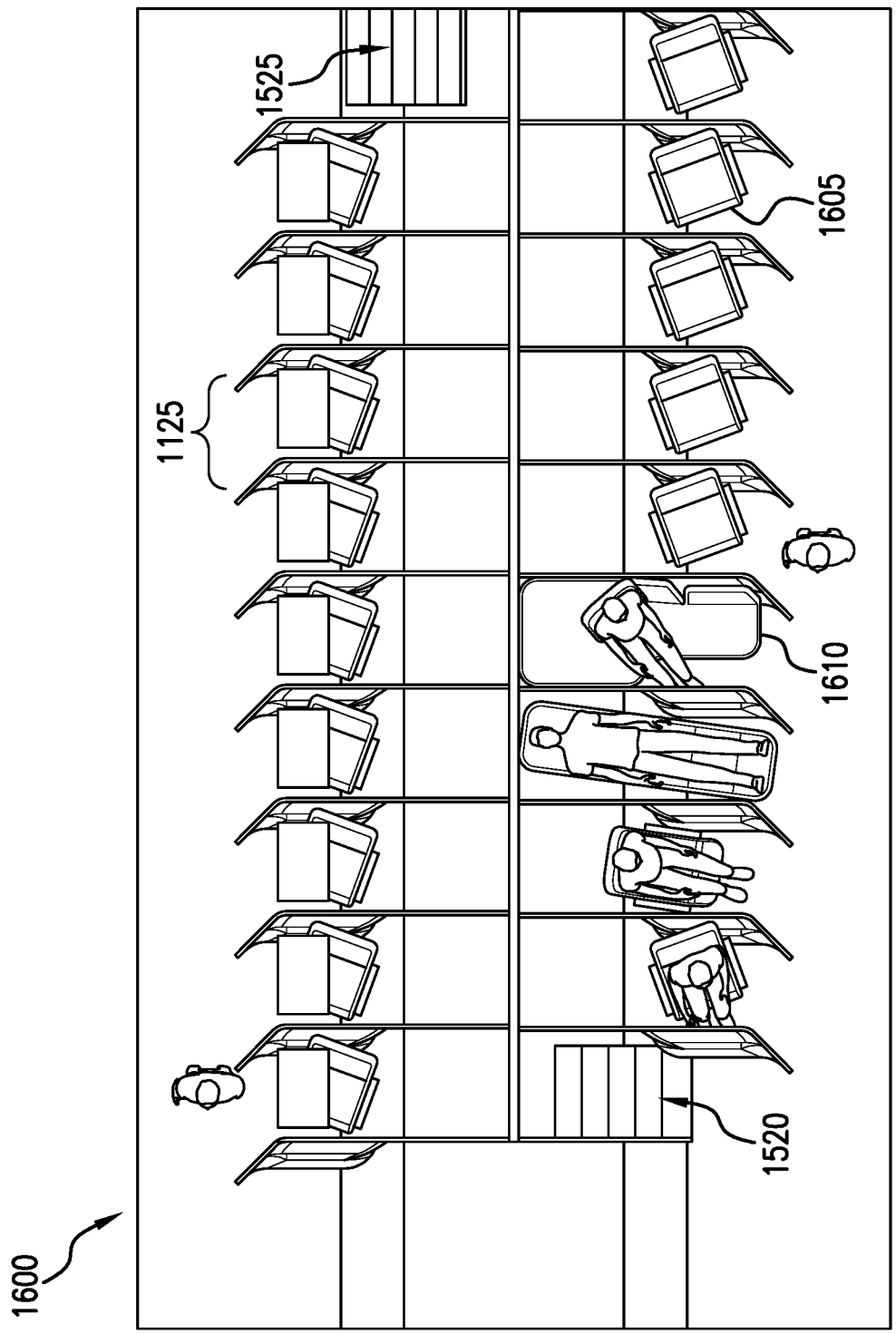
FIG. 16 depicts a plan view of an aircraft cabin illustrating an exemplary lower deck business-class seating arrangement.

FIG. 16 depicts a plan view of an aircraft cabin illustrating an exemplary lower level business-class seating arrangement. An aircraft cabin lower level 1600 includes the multiple individual business-class suites 1125. Each business-class suite 1125 includes a business-class seat 1605. In some embodiments, a lounge seat 1610 may take the place of the business-class seat 1605. The aircraft cabin lower level 1600 also contains the forward staircase 1520 and the aft staircase 1525.

Figure 17:
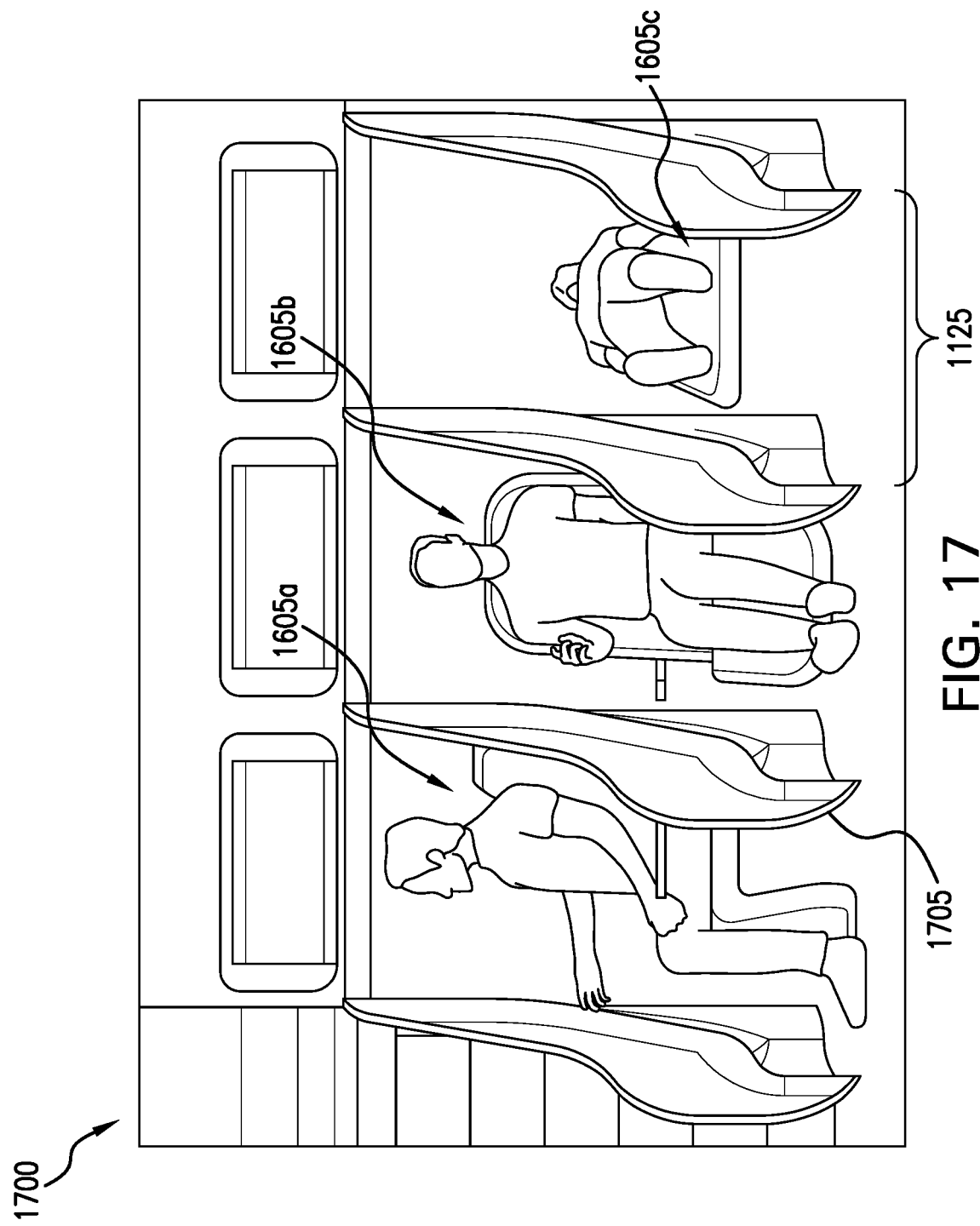
FIG. 17 depicts a side elevation view of an aircraft cabin illustrating exemplary business-class seating embodiments.

FIG. 17 depicts a side elevation view of an aircraft cabin illustrating exemplary business-class seating embodiments. An aircraft cabin 1700 includes the business-class suites 1125. The business-class suites 1125 are separated by walls 1705. The business-class suites 1125 include business-class convertible seats 1605a, 1605b, and 1605c. The business-class convertible seats 1605a, 1605b, and 1605c may face forward during take-off taxing and landing (TTL) as depicted in seat 1605a, may rotate sideways during flight as depicted in seat 1605b, and may open to become a sleeping surface as depicted in seat 1605c. For example, the business-class suites 1125 may be sized such that one or more of the convertible seats 1605a, 1605b, and 1605c can be extended only in a rotated orientation (e.g., lateral to a longitudinal axis of the aircraft or otherwise offset to the longitudinal axis of the aircraft).

Figure 18:
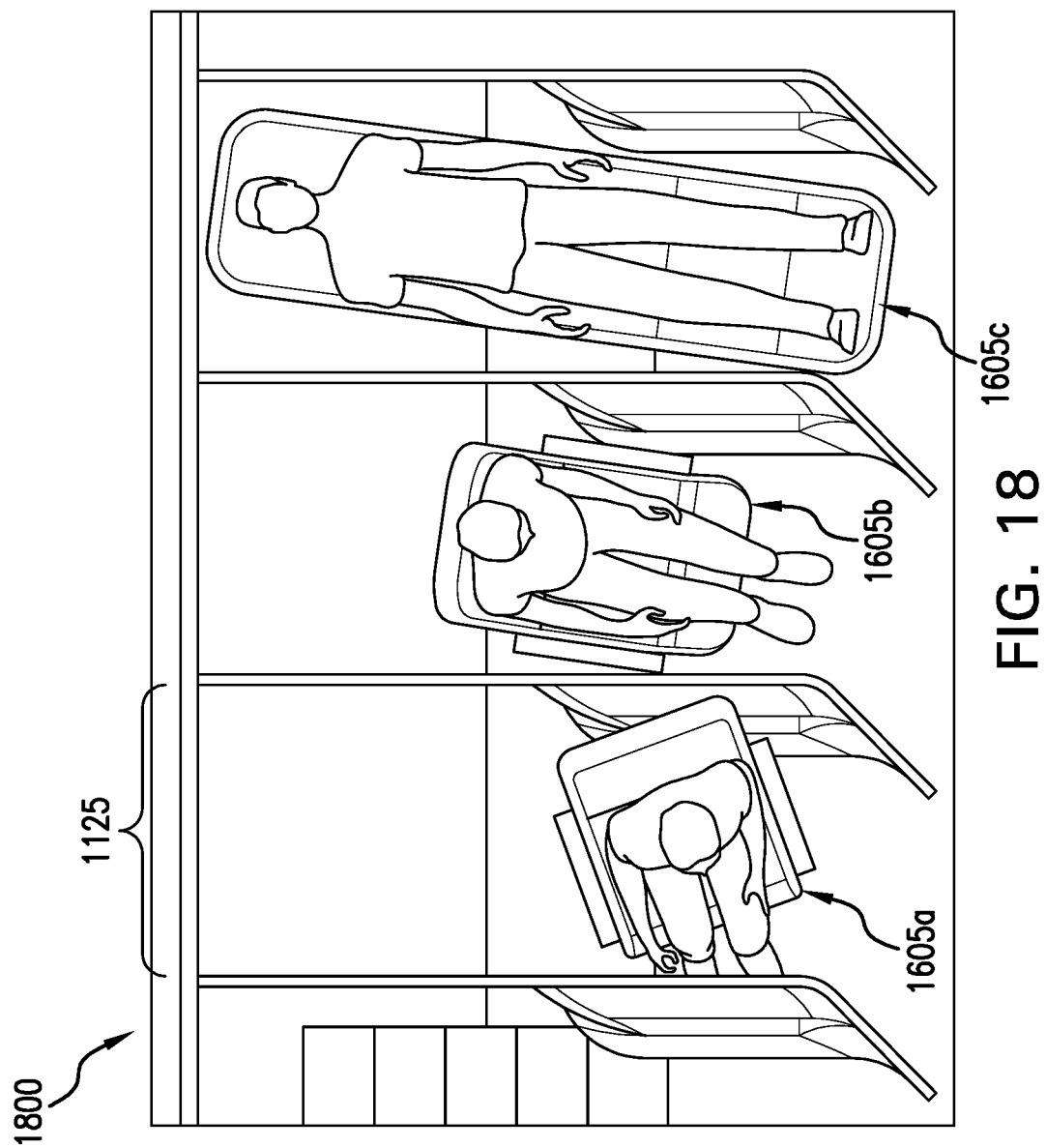
FIG. 18 depicts a perspective view of an aircraft cabin illustrating an exemplary lower deck business-class seating arrangement.

FIG. 18 depicts a perspective view of an aircraft cabin illustrating an exemplary lower deck business-class seating arrangement. An aircraft cabin 1800 includes business-class suites 1125. The depicted business-class suites 1125 include the business-class convertible seats 1605a, 1605b, 1605c. The business-class convertible seats 1605a-1605c face forward during take-off taxing and landing (TTL) as depicted in seat 1605a, rotate sideways during flight as depicted in seat 1605b, and open to become a sleeping surface as depicted in seat 1605c.

Figure 19:
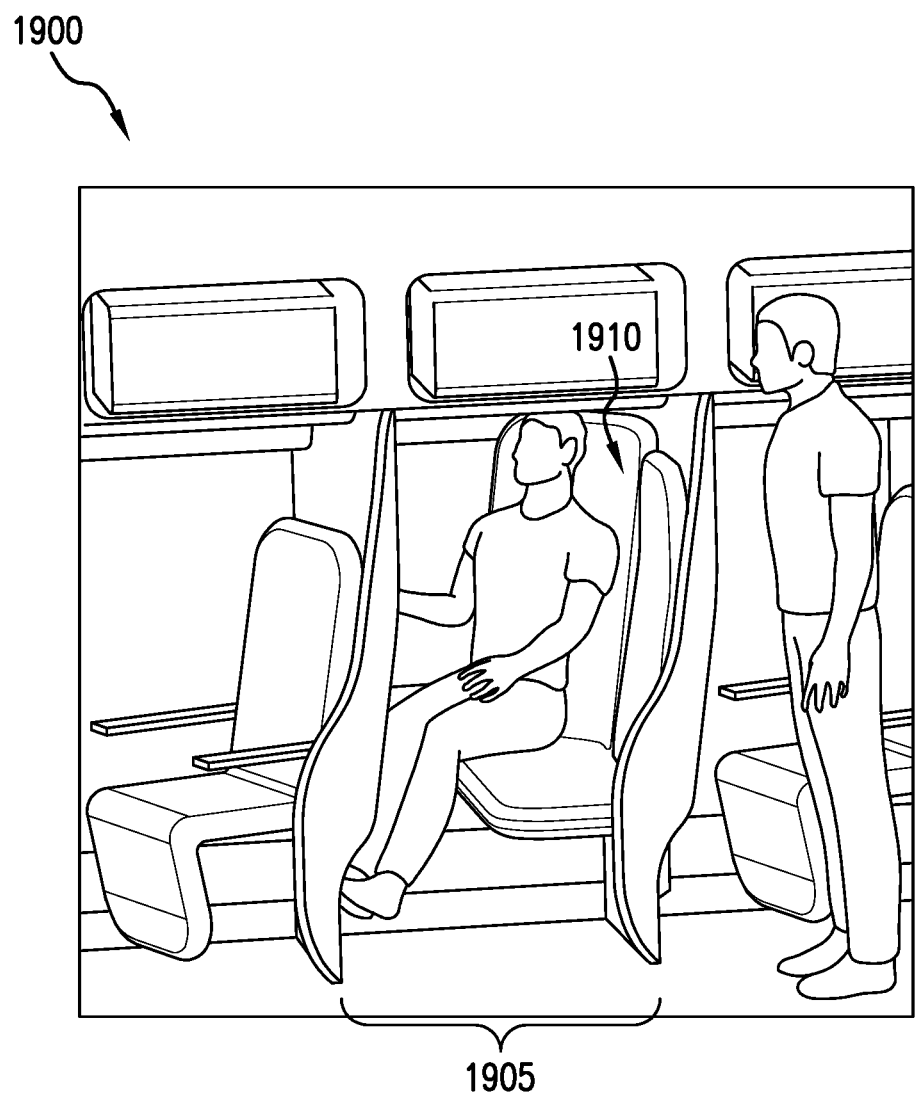
FIG. 19 depicts a perspective view of an exemplary modular couch.

FIG. 19 depicts a perspective view of an exemplary modular couch. A business-class seating area 1900 contains a business-class suite 1905. The business-class suite 1905 includes a modular couch 1910. In some examples, the modular couch 1910 may provide passengers a comfortable and versatile seating option.

Figure 20:
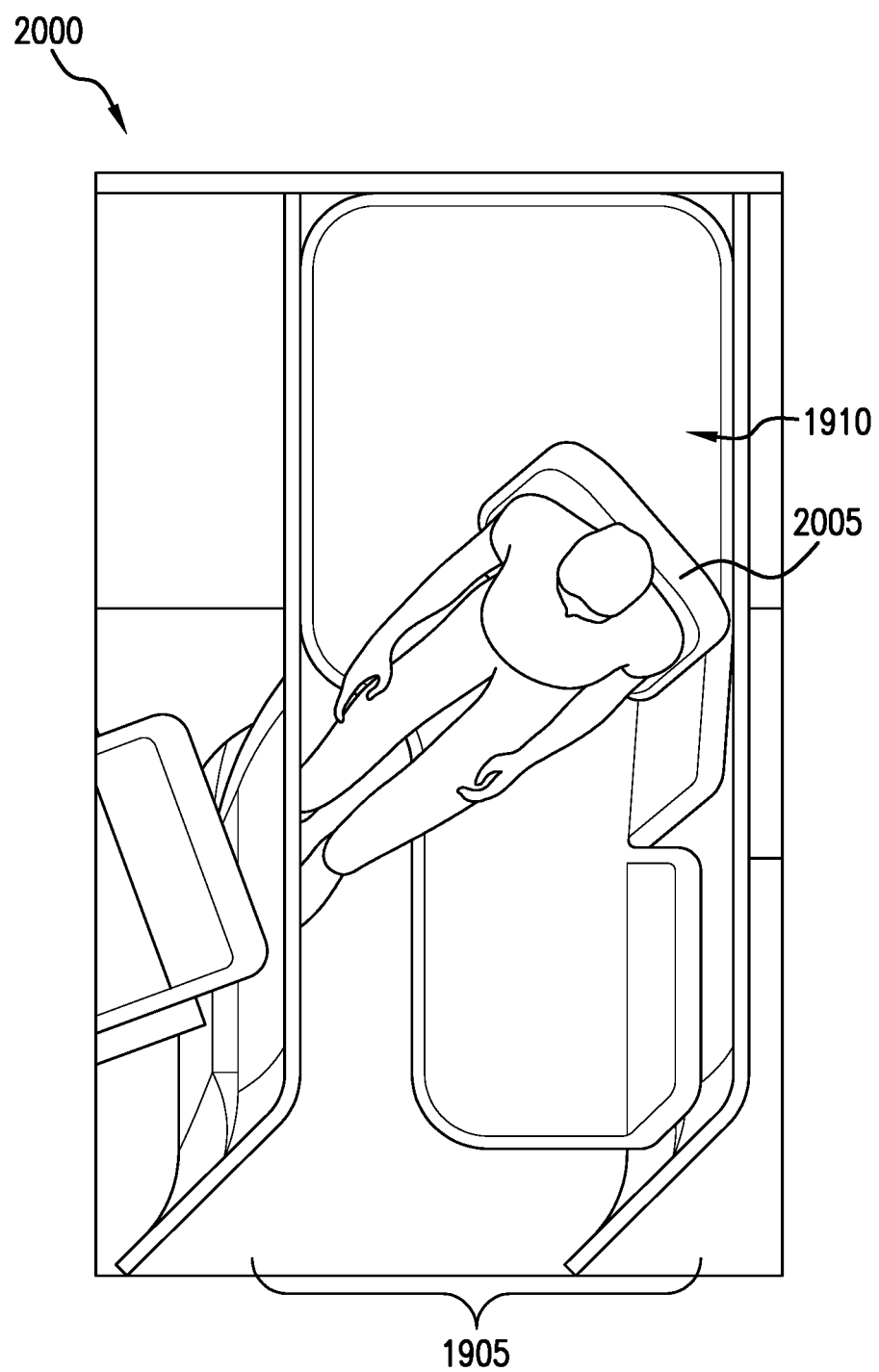
FIG. 20 depicts a perspective view of an exemplary modular couch.

FIG. 20 depicts a perspective view of an exemplary modular couch. A business-class seating area 2000 contains the business-class suite 1905. The business-class suite 1905 includes the modular couch 1910. The modular couch 1910 contains an integral seat 2005. The integral seat 2005 faces forward for TTL and becomes a modular couch during flight, similar to the modular couch 1910. The modular couch 1910 may advantageously provide a large sleeping surface. In some embodiments, the integral chair 2005 may include back supports and fold out arm rests.

Figure 21:
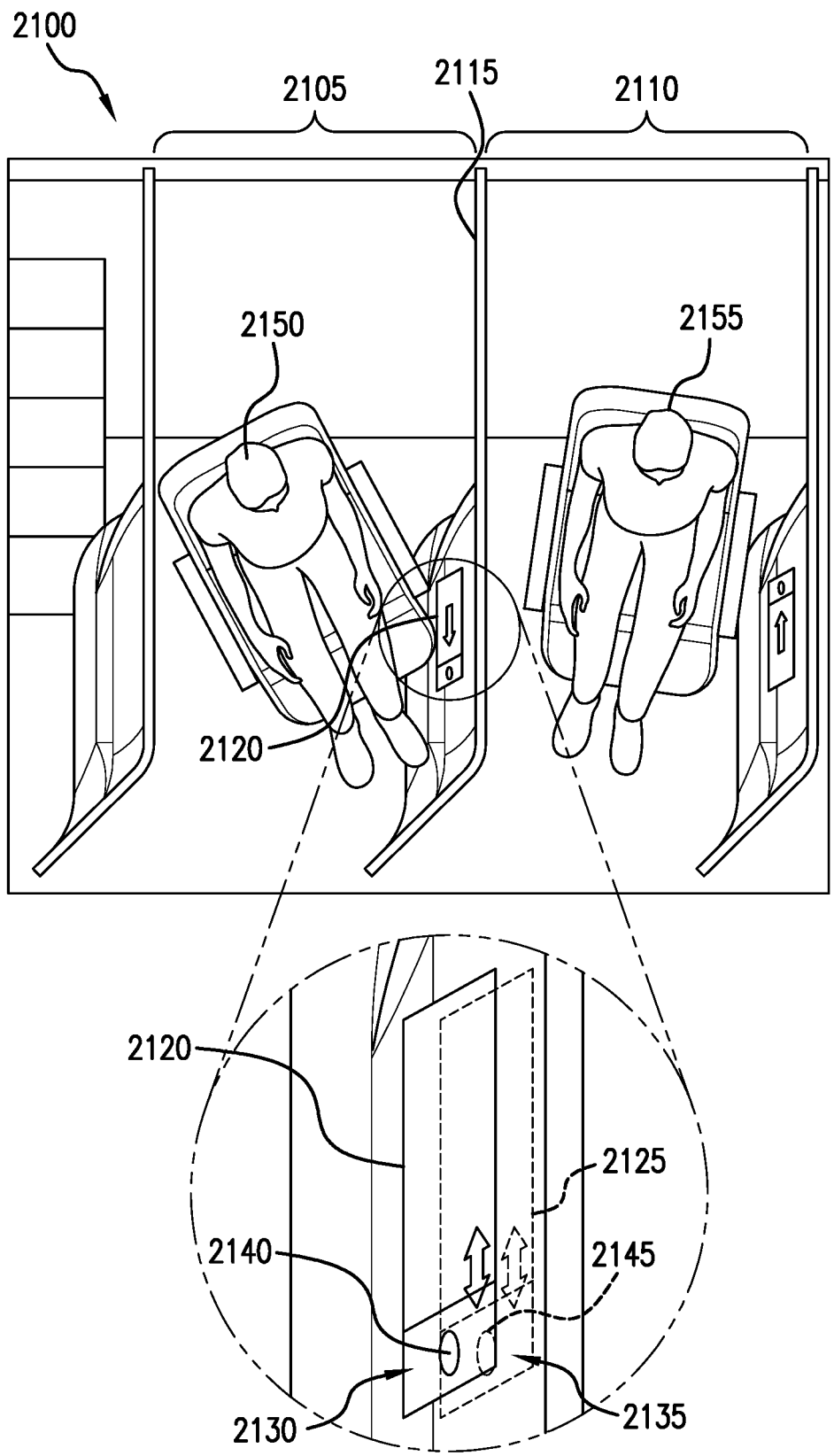
FIG. 21 depicts a perspective view of an aircraft cabin illustrating an exemplary lower deck business-class seating arrangement with an adjoining conference window.

FIG. 21 depicts a perspective view of an aircraft cabin illustrating an exemplary lower deck business-class seating arrangement with an adjoining conference window. An aircraft cabin 2100 includes a first carrel 2105 and a second carrel 2110. Separating the first carrel 2105 and the second carrel 2110 is a divider wall 2115. The divider wall 2115 contains a left communication aperture 2120 and a right communication aperture 2125. The left communication aperture 2120 includes a left independent door 2130. The right communication aperture 2125 includes a right independent door 2135. The left independent door 2130 includes a left door knob 2140. The right independent door 2135, includes a right door knob 2145. The left independent door 2130 is slidably coupled to the top and bottom edges of the left communication aperture 2120. The right independent door 2135 is slidably coupled to the top and bottom edges of the right communication aperture 2125. In some embodiments, the left independent door 2130 may allow a first passenger 2150 to independently allow conversation with a second passenger 2155. Unless the left independent door 2130 and the right independent door 2135 are both open, the communication aperture made up of the left communication aperture 2120 and the right communication aperture 2125 is closed to conversation. In an exemplary embodiment, the operation of the communication apertures 2120 and 2125, may be similar to adjoining hotel rooms. In some embodiments, the independent doors 2130 and 2135 may hide away inside the divider wall 2115 when open, which may be similar to the operation of a pocket door for example. In some examples the independent doors 2130, 2135 may be made of a flexible material such that the independent doors 2130, 2135 may roll-up onto a spring-loaded cylinder, for example.

Figure 22:
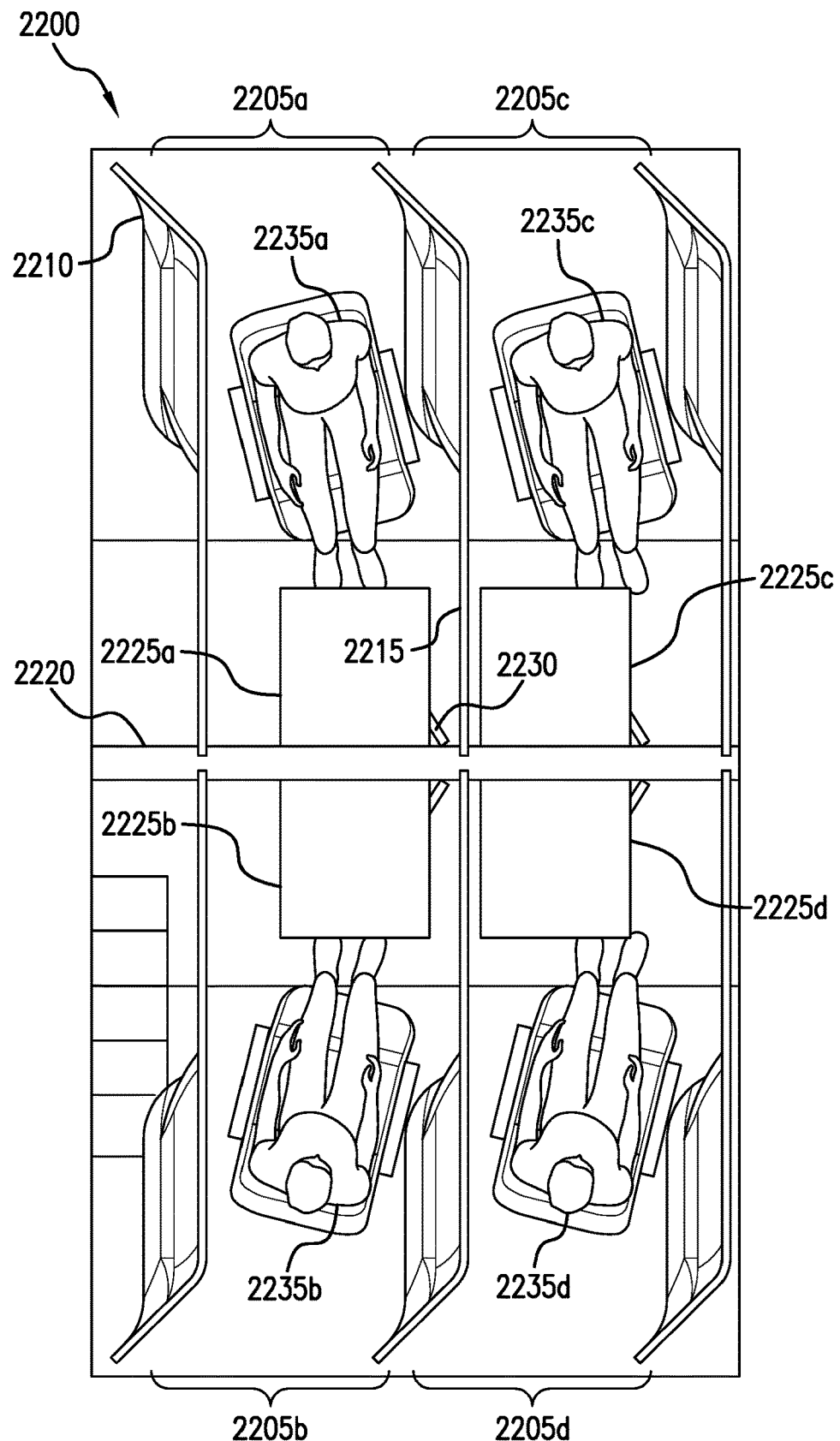
FIG. 22 depicts a perspective view of an aircraft cabin illustrating an exemplary lower deck business-class seating arrangement with adjoining fold-down workspaces.

FIG. 22 depicts a perspective view of an aircraft cabin illustrating an exemplary lower deck business-class seating arrangement with adjoining fold-down workspaces. A business-class seating arrangement 2200 includes an independent passenger compartment 2205a. The independent passenger compartment 2205a is surrounded by three walls: a left wall 2210, a right wall 2215 and a central wall 2220. The central wall 2220 includes a first fold-down work surface 2225a. The first fold-down work surface 2225a includes a support bracket 2230. The first fold-down work surface 2225a groups with a second fold-down work surface 2225b from an adjacent independent passenger compartment 2205b, situated on the opposite side of the central wall 2220. The first fold-down work surface 2225a groups with a third fold-down work surface 2225c from an adjacent independent passenger compartment 2205c. The third fold-down work surface 2225c groups with a fourth fold-down work surface 2225d from an adjacent independent passenger compartment 2205d, situated on the opposite side of the central wall 2220. The work surfaces 2225a-2225d may be grouped to form a larger conference table. In some examples the fold-down work surfaces 2225a-2225d may be manipulated by a passenger 2235a, 2235b, 2235c, 2235d, such that the fold-down work surfaces 2225a-2225d may be stowed in the upright state for privacy, and may be deployed in the folded-down state to collaborate with other passengers 2235a-2235d.

Although various embodiments have been described with reference to the figures, other embodiments are possible.

In an exemplary aspect, an aircraft cabin system includes a lower deck defining a horizontal floor surface extending substantially in a horizontal plane that longitudinally divides an interior space of a substantially cylindrical fuselage section. The horizontal floor surface is disposed between the nose and the tail of an airframe to form a cabin space above the lower deck. The system further includes an upper deck partition that longitudinally divides the cabin space to define a lower cabin space below the upper deck partition and above the lower deck. The upper deck partition further defines an upper cabin space above the upper deck partition and below a wall of the fuselage section. A first portion of the upper deck partition has a first elevation above the lower deck along a longitudinal centerline of the fuselage section. The system further includes an elevated walkway having a centerline aisle in the upper cabin space. The centerline aisle extends parallel to the centerline in a longitudinal direction and extends laterally from the centerline to permit a passenger to walk along the centerline in the upper cabin space. The system further includes two or more passenger cabins formed in the upper cabin space and on either lateral side of the elevated walkway. Each one of the passenger cabins is at least partially disposed above a second portion of the upper deck partition at a second elevation above the lower deck. The second elevation exceeds the first elevation. At least two passenger seating spaces are located in the lower cabin space directly between the second portion of the upper deck partition and the lower deck.

In some embodiments, the system may further include a lower cabin aisle formed in the lower cabin space and extending longitudinally and parallel to the centerline. The lower cabin aisle may be disposed directly under the second portion of the upper deck partition.

In some examples, the system may further include a third portion of the upper deck partition at a third elevation above the lower deck. The third elevation may exceed the second elevation. The system may further include a lower cabin aisle formed in the lower cabin space and extending longitudinally and parallel to the centerline. The lower cabin aisle may be disposed directly under the third portion of the upper deck partition.

In some embodiments, the system may further include a staircase extending from the lower deck to the upper deck, either aligned along the centerline or aligned substantially orthogonal to the centerline.

In an illustrative example, the passenger seating spaces may further include two or more seating pods. The seating pods may be arranged in a substantially herringbone pattern. At least some of the seating pods may be oriented at an acute angle with respect to the centerline.

In some embodiments, the passenger cabins may each have an inboard wall adjacent the centerline aisle, an outboard wall opposite the inboard wall, an aft wall and an opposing forward wall that connect the inboard wall to the outboard wall. A display device may be mounted on the outboard wall.

Apparatus and associated methods may relate to a dual-level aircraft cabin layout with an elevated walkway with additional passenger seating, and enclosed private structures with seats operable to face forward, face sideways and lie flat, and articulating walls converting to work surfaces, and closeable apertures between passengers. In an exemplary embodiment, an aircraft may employ the elevated walkway to increase passenger seating capacity, thereby increasing profits. In some examples, passengers may be provided with privacy, with private structures between seats, and may find benefit from rotating seats for more legroom, and may find further benefit from seats that convert to a sleeping surface, that may be substantially flat and parallel with the floor. In some embodiments, passengers may advantageously manipulate fold-out tables and slidable doors within apertures to collaborate with other passengers. In some examples, airlines may attract customers or may justify fare increases due to the additional amenities.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. An aircraft cabin system, the system comprising:
a lower deck defining a horizontal floor surface extending substantially in a horizontal plane that longitudinally divides an interior space of a fuselage section disposed at least partway between a nose and a tail of an airframe to form a cabin space above the lower deck;
an upper deck partition that longitudinally divides the cabin space to define a lower cabin space below the upper deck partition and above the lower deck, and further defining an upper cabin space above the upper deck partition and below a wall of the fuselage section, wherein a first portion of the upper deck partition has a first elevation above the lower deck along a longitudinal axis of the fuselage section;
an elevated walkway comprising an aisle in the upper cabin space, the aisle extending substantially parallel to the longitudinal axis of the aircraft and configured to permit a passenger to walk along the aisle in the upper cabin space;
a plurality of passenger cabins disposed in the upper cabin space arranged to form a single column of passenger cabins positioned along each lateral side of the elevated walkway, each one of the plurality of passenger cabins being at least partially disposed above a second portion of the upper deck partition at a second elevation above the lower deck, wherein the second elevation exceeds the first elevation, and each of the plurality of passenger cabins including a seat positioned therein adjacent the elevated walkway and a fixed bed positioned therein laterally adjacent the seat and apart from the elevated walkway, each of the seat and the fixed bed having a longitudinal axis extending substantially parallel to the longitudinal axis of the aircraft; and
a plurality of passenger seating spaces located in the lower cabin space between the second portion of the upper deck partition and the lower deck, wherein each of the plurality of passenger seating spaces located in the lower cabin space includes a seat positioned therein extending at an angle to the longitudinal axis of the aircraft;
wherein seat density in the lower cabin space is greater than seat density in the upper cabin space.

2. The aircraft cabin system of claim 1, wherein the upper deck partition includes a ceiling positioned above the lower cabin space, the ceiling having a first elevation proximate a fuselage transitioning to a second elevation proximate the elevated walkway, wherein the second elevation is lower than the first elevation.

3. The aircraft cabin system of claim 2, wherein a lowermost extent of the elevated walkway is positioned at a third elevation lower than the second elevation.

4. The aircraft cabin system of claim 1, wherein each of the plurality of passenger cabins formed in the upper cabin space are individual passenger suites equipped with a closing door positioned to a side of the seat opposite the fixed bed.

5. The aircraft cabin system of claim 1, wherein each seat positioned in the plurality of passenger cabins formed in the upper cabin space is positioned directly adjacent the aisle in the upper cabin space and has direct aisle access.

6. The aircraft cabin system of claim 5, wherein each seat positioned in the plurality of passenger cabins formed in the upper cabin space is a transformable seat configured to be unfolded into a co-planar sleeping surface.

7. The aircraft cabin system of claim 1, wherein the plurality of passenger seating spaces located in the lower cabin space includes a herringbone arrangement of seating pods each including a passenger seat.

8. The aircraft cabin system of claim 1, wherein the upper cabin space includes at least one seating section and a lounge or bar area.

9. An aircraft cabin system, the system comprising:
a lower deck defining a horizontal floor surface extending substantially in a horizontal plane that longitudinally divides an interior space of a fuselage section;
an upper deck partition positioned above the lower deck, the upper deck partition longitudinally dividing cabin space to define a lower cabin space below the upper deck partition and above the lower deck, and an upper cabin space above the upper deck partition;
an elevated walkway bisecting the upper deck partition and including an aisle in the upper cabin space, the aisle extending substantially parallel to a longitudinal axis of the aircraft and configured to permit a passenger to walk along the aisle in the upper cabin space;
a plurality of passenger cabins positioned in the upper cabin space, the plurality of passenger cabins arranged to form a single column of passenger cabins along each lateral side of the elevated walkway, each of the plurality of passenger cabins being at least partially disposed above a second portion of the upper deck partition at a second elevation above the lower deck, wherein the second elevation exceeds the first elevation, and each of the plurality of passenger cabins including a seat and a fixed bed positioned therein, each of the seat and the fixed bed having a longitudinal axis extending substantially parallel to the longitudinal axis of the aircraft; and
a plurality of passenger seating spaces located in the lower cabin space between the second portion of the upper deck partition and the lower deck, wherein each of the plurality of passenger seating spaces located in the lower cabin space includes a seat positioned therein extending at an angle to the longitudinal axis of the aircraft;
wherein seat density in the lower cabin space is greater than seat density in the upper cabin space.

10. The aircraft cabin system of claim 9, wherein the upper deck partition includes a ceiling positioned above the lower cabin space, the ceiling having a first elevation proximate a fuselage transitioning lower to a second elevation proximate the elevated walkway.

11. The aircraft cabin system of claim 10, wherein a lowermost extent of the elevated walkway is positioned at a third elevation lower than the second elevation.

12. The aircraft cabin system of claim 9, wherein each of the plurality of passenger cabins formed in the upper cabin space are individual passenger suites equipped with a closing door positioned to a side of the seat opposite the fixed bed.

13. The aircraft cabin system of claim 9, wherein each seat positioned in the plurality of passenger cabins formed in the upper cabin space is positioned directly adjacent the aisle in the upper cabin space and has direct aisle access.

14. The aircraft cabin system of claim 13, wherein each seat positioned in the plurality of passenger cabins formed in the upper cabin space is a transformable seat configured to be unfolded into a co-planar sleeping surface.

15. The aircraft cabin system of claim 9, wherein the plurality of passenger seating spaces located in the lower cabin space includes a herringbone arrangement of seating pods each including a passenger seat.

16. The aircraft cabin system of claim 9, wherein the upper cabin space includes at least one seating section and a lounge or bar area.

* * * * *